(12) United States Patent
Han

(10) Patent No.: US 11,064,540 B2
(45) Date of Patent: *Jul. 13, 2021

(54) DATA SENDING METHOD, RESOURCE MEASUREMENT METHOD, APPARATUS, AND DEVICE

(71) Applicant: HUAWEI TECHNOLOGIES CO.,LTD., Guangdong (CN)

(72) Inventor: Guanglin Han, Munich (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/417,506

(22) Filed: May 20, 2019

(65) Prior Publication Data
US 2019/0274163 A1 Sep. 5, 2019

Related U.S. Application Data

(63) Continuation of application No. 15/588,157, filed on May 5, 2017, now Pat. No. 10,299,296, which is a
(Continued)

(51) Int. Cl.
*H04W 74/08* (2009.01)
*H04W 72/12* (2009.01)
(Continued)

(52) U.S. Cl.
CPC ......... *H04W 74/085* (2013.01); *H04W 72/12* (2013.01); *H04W 74/006* (2013.01); *H04W 88/02* (2013.01)

(58) Field of Classification Search
CPC .. H04W 72/12; H04W 74/006; H04W 74/085
See application file for complete search history.

(56) References Cited

U.S. PATENT DOCUMENTS

2011/0274040 A1 11/2011 Pani et al.
2012/0300744 A1 11/2012 Larmo et al.
(Continued)

FOREIGN PATENT DOCUMENTS

CN 101360025 A 2/2009
CN 102083224 A 6/2011
(Continued)

OTHER PUBLICATIONS

3GPP TS 36.213 V123.0 (Sep. 2014), 3rd Generation Partnership Project;Technical Specification Group Radio Access Network;Evolved Universal Terrestrial Radio Access (E-UTRA);Physical layer procedures(Release 12), 212 pages.
(Continued)

*Primary Examiner* — Gary Mui
(74) *Attorney, Agent, or Firm* — Paul Christopher Hashim

(57) ABSTRACT

Embodiments of the present invention provide a data sending method, a resource measurement method, an apparatus, and a device. The method includes: generating, by user equipment, communication service data; obtaining competitive resource configuration information used for sending the communication service data; determining, according to the competitive resource configuration information, a competitive resource configured for the user equipment; and sending the communication service data on the competitive resource. Compared with a scenario in which all user equipments simultaneously use a same resource, in the present invention, competitive resources are respectively and flexibly configured for multiple user equipments that perform communication services.

20 Claims, 12 Drawing Sheets

Related U.S. Application Data continuation of application No. PCT/CN2014/090479, filed on Nov. 6, 2014.

(51) Int. Cl.
*H04W 74/00* (2009.01)
*H04W 88/02* (2009.01)

(56) References Cited

U.S. PATENT DOCUMENTS

| | | | |
|---|---|---|---|
| 2013/0017794 A1 | 1/2013 | Kloper et al. | |
| 2013/0022016 A1 | 1/2013 | Wei | |
| 2013/0267230 A1* | 10/2013 | Lin | H04W 24/02 455/436 |
| 2013/0286992 A1 | 10/2013 | Hong | |
| 2013/0322408 A1* | 12/2013 | Lim | H04W 72/0406 370/331 |
| 2014/0112264 A1 | 4/2014 | Bao et al. | |
| 2014/0256328 A1* | 9/2014 | Li | H04W 36/0058 455/444 |
| 2015/0131465 A1* | 5/2015 | Dalsgaard | H04W 24/10 370/252 |
| 2015/0215903 A1* | 7/2015 | Zhao | H04W 72/04 370/329 |
| 2015/0271786 A1 | 9/2015 | Xue et al. | |
| 2015/0282210 A1 | 10/2015 | Li et al. | |
| 2015/0326492 A1* | 11/2015 | Jeong | H04L 47/72 370/329 |
| 2017/0086214 A1* | 3/2017 | Kalhan | H04L 5/001 |

FOREIGN PATENT DOCUMENTS

| | | |
|---|---|---|
| CN | 102088775 A | 6/2011 |
| CN | 102118189 A | 7/2011 |
| CN | 102158981 A | 8/2011 |
| CN | 103281731 A | 9/2013 |
| JP | 2011142533 A | 7/2011 |
| JP | 2013516944 A | 5/2013 |
| JP | 2013520103 A | 5/2013 |
| JP | 2015528653 A | 9/2015 |
| WO | 2011100596 A2 | 8/2011 |
| WO | 2014029426 A1 | 2/2014 |

OTHER PUBLICATIONS

3GPP TS 36.214 V12.0.0 (Sep. 2014), 3rd Generation Partnership Project;Technical Specification Group Radio Access Network;Evolved Universal Terrestrial Radio Access (E-UTRA);Physical layer;Measurements(Release 12), 14 pages.

3GPP TS 36321 V12.3.0 (Sep. 2014), 3rd Generation Partnership Project;Technical Specification Group Radio Access Network;Evolved Universal Terrestrial Radio Access (E-UTRA);Medium Access Control (MAC) protocol specification (Release 12), 57 pages.

3GPP TS 36331 V12.3.0 (Sep. 2014), 3rd Generation Partnership Project;Technical Specification Group Radio Access Universal Terrestrial Radio Access (E-UTRA);Radio Resource Control (RRC);Protocol specification (Release 12), 377 pages.

* cited by examiner

DATA SENDING METHOD, RESOURCE MEASUREMENT METHOD, APPARATUS, AND DEVICE

CROSS-REFERENCE TO RELATED APPLICATIONS

This application is a continuation of U.S. patent application Ser. No. 15/588,157, filed on May 5, 2017, which is a continuation of International Application No. PCT/CN2014/090479, filed on Nov. 6, 2014. All of the afore-mentioned patent applications are hereby incorporated by reference in their entireties.

TECHNICAL FIELD

The present invention relates to the field of wireless communications technologies, and in particular, to a data sending method, a resource measurement method, an apparatus, and a device.

BACKGROUND

With development and popularization of wireless communications technologies, a quantity of user equipments is exponentially increased. When multiple user equipments exist in coverage of a wireless signal of a network device, to improve resource utilization, the multiple user equipments may share a wireless resource provided by the network device, and each user equipment can send data on the wireless resource. However, when multiple user equipments need to send data, a conflict may occur, and network congestion is caused.

To reduce a probability of a conflict, when any user equipment needs to send data, the user equipment may first listen to a use status of the wireless resource, wait for a random time period when determining that the wireless resource is in an idle state, and then send the data on the wireless resource when determining that the wireless resource is still in an idle state.

Each user equipment individually performs the foregoing steps of listening to a use status of a wireless resource, waiting for a random time period, and sending data. When many user equipments need to send data in a short time period, multiple user equipments may simultaneously detect that the wireless resource is in an idle state, and simultaneously send data on the wireless resource. In this case, a conflict may still occur, and network congestion is caused.

SUMMARY

To resolve a problem of network congestion caused by a conflict, embodiments of the present invention provide a data sending method, a resource measurement method, an apparatus, and a device. The technical solutions are as follows.

According to a first aspect, a data sending method is provided. The method includes: generating, by user equipment, communication service data. The method also includes obtaining, by the user equipment, competitive resource configuration information used for sending the communication service data, and determining, by the user equipment according to the competitive resource configuration information, a competitive resource configured for the user equipment. The method also includes sending, by the user equipment, the communication service data on the competitive resource.

With reference to the first aspect, in a first possible implementation manner of the first aspect, the obtaining, by the user equipment, competitive resource configuration information used for sending the communication service data further includes: determining, by the user equipment, whether to initiate a resource request used for obtaining the competitive resource configuration information; if the user equipment determines to initiate the resource request, sending the resource request to a network device; receiving, by the user equipment, a configuration response message sent by the network device; and obtaining, by the user equipment, the competitive resource configuration information according to the configuration response message.

With reference to the first possible implementation manner of the first aspect, in a second possible implementation manner of the first aspect, the determining, by the user equipment, whether to initiate a resource request used for obtaining the competitive resource configuration information further includes at least one of the following: determining, by the user equipment according to a resource request indication, to initiate the resource request, where the resource request indication is preconfigured on the user equipment or pre-sent by the network device to the user equipment; or determining, by the user equipment according to a type of a communication service, whether to initiate the resource request; or when it is detected that the user equipment is currently in coverage of a wireless signal of the network device, determining, by the user equipment, to initiate the resource request; or measuring, by the user equipment, a load amount of a current competitive resource, and when the load amount is greater than a first preset load threshold, determining to initiate the resource request.

With reference to the first aspect, in a third possible implementation manner of the first aspect, the obtaining, by the user equipment, competitive resource configuration information used for sending the communication service data further includes: obtaining, by the user equipment, the competitive resource configuration information from resource configuration information preconfigured on the user equipment; or obtaining, by the user equipment, the competitive resource configuration information according to an activation time of a communication service; or receiving, by the user equipment, a broadcast message of a network device, and obtaining the competitive resource configuration information from the broadcast message; or measuring, by the user equipment, load amounts of multiple candidate resources, and obtaining the competitive resource configuration information according to a measurement result.

With reference to the third possible implementation manner of the first aspect, in a fourth possible implementation manner of the first aspect, the obtaining the competitive resource configuration information according to a measurement result further includes: if the user equipment determines that a load amount of a first candidate resource in the multiple candidate resources is less than a second preset load threshold, determining resource information of the first candidate resource as the competitive resource configuration information; or determining resource information of a candidate resource with a minimum load amount in the multiple candidate resources as the competitive resource configuration information.

With reference to the third possible implementation manner of the first aspect, in a fifth possible implementation manner of the first aspect, the obtaining the competitive resource configuration information according to a measurement result further includes: if the user equipment determines that a load amount of a first candidate resource in the multiple candidate resources is less than a second preset load threshold, determining resource information of the first candidate resource as the competitive resource configuration information; or determining resource information of a candidate resource with a minimum load amount in the multiple candidate resources as the competitive resource configuration information.

With reference to the first aspect, in a sixth possible implementation manner of the first aspect, the sending, by the user equipment, the communication service data on the competitive resource further includes: sending, by the user equipment, the communication service data on the competitive resource when determining the competitive resource; or generating, by the user equipment, backoff duration after determining the competitive resource, and sending the communication service data after the backoff duration expires; or determining, by the user equipment after determining the competitive resource, whether the competitive resource is idle, and sending the communication service data if the competitive resource is idle; or generating, by the user equipment, backoff duration after determining the competitive resource, determining, after the backoff duration expires, whether the competitive resource is idle, and sending the communication service data if the competitive resource is idle.

With reference to the first aspect, in a seventh possible implementation manner of the first aspect, the determining, by the user equipment according to the competitive resource configuration information, a competitive resource configured for the user equipment further includes: determining, by the user equipment according to the competitive resource configuration information, a competitive resource style configured for the user equipment, where the competitive resource style includes a distribution rule of multiple competitive resources; and determining the multiple competitive resources according to the distribution rule.

With reference to the seventh possible implementation manner of the first aspect, in an eighth possible implementation manner of the first aspect, the competitive resource style includes at least one of the following: a resource start location and a resource end location of the multiple competitive resources; or an allocation cycle of the multiple competitive resources, and at least one resource start location and at least one resource end location of each competitive resource in a corresponding allocation cycle; or an allocation cycle of the multiple competitive resources, and a resource start location and a resource length of each competitive resource in a corresponding allocation cycle.

With reference to the first aspect, in a ninth possible implementation manner of the first aspect, the sending, by the user equipment, the communication service data on the competitive resource includes: sending, by the user equipment, the communication service data on the competitive resource to another user equipment by using a wireless interface between the user equipment and the another user equipment; or sending, by the user equipment, the communication service data on the competitive resource to a network device by using a wireless interface between the user equipment and the network device.

According to a second aspect, a resource measurement method is provided. The method includes generating, by user equipment, communication service data, and obtaining, by the user equipment, competitive resource configuration information used for sending the communication service data. The method also includes determining, by the user equipment according to the competitive resource configuration information, a competitive resource style configured for the user equipment, where the competitive resource style includes a distribution rule of multiple competitive resources. The method also includes measuring, by the user equipment, the multiple competitive resources according to the distribution rule, to obtain a measurement result. The method also includes determining, by the user equipment, whether to send a measurement result report to a network device. The method also includes, if the user equipment determines to send the measurement result report to the network device, sending a measurement result report that includes the measurement result to the network device.

With reference to the second aspect, in a first possible implementation manner of the second aspect, the measuring, by the user equipment, the multiple competitive resources according to the distribution rule, to obtain a measurement result further includes at least one of the following: when the competitive resource style includes a resource start location and a resource end location of the multiple competitive resources, measuring, by the user equipment, competitive resources between the resource start location and the resource end location, to obtain a measurement result; or when the competitive resource style includes an allocation cycle of the multiple competitive resources, and at least one resource start location and at least one resource end location of each competitive resource in a corresponding allocation cycle, for each allocation cycle, determining, by the user equipment, multiple competitive resources in the allocation cycle according to the at least one resource start location and the at least one resource end location in the allocation cycle, and measuring the multiple competitive resources, to obtain a measurement result; or when the competitive resource style includes an allocation cycle of the multiple competitive resources, and a resource start location and a resource length of each competitive resource in a corresponding allocation cycle, for each allocation cycle, determining, by the user equipment, competitive resources in the allocation cycle according to the resource start location and the resource length in the allocation cycle, and measuring the competitive resources, to obtain a measurement result.

According to a third aspect, a data sending method is provided. The method includes configuring, by a network device, a competitive resource for user equipment according to load amounts of multiple resources when receiving a resource request of the user equipment. The method also includes sending, by the network device, a configuration response message to the user equipment according to the competitive resource, so that the user equipment obtains competitive resource configuration information according to the configuration response message, determines, according to the competitive resource configuration information, the competitive resource configured for the user equipment, and sends generated communication service data on the competitive resource.

With reference to the third aspect, in a first possible implementation manner of the third aspect, the sending, by the network device, a configuration response message to the user equipment according to the competitive resource further includes: broadcasting, by the network device, the configuration response message, so that the user equipment receives the configuration response message; or sending, by the network device, the configuration response message to the user equipment in a unicast manner.

According to a fourth aspect, a data sending apparatus is provided. The apparatus includes: a data obtaining module, configured to generate communication service data. The apparatus also includes a configuration information obtaining module, configured to obtain competitive resource configuration information used for sending the communication service data generated by the data obtaining module. The apparatus also includes a competitive resource determining module, configured to determine, according to the competitive resource configuration information obtained by the configuration information obtaining module, a competitive resource configured for the user equipment. The apparatus also includes a sending module, configured to send, on the competitive resource determined by the competitive resource determining module, the communication service data generated by the data obtaining module.

With reference to the fourth aspect, in a first possible implementation manner of the fourth aspect, the configuration information obtaining module is configured to: determine whether to initiate a resource request used for obtaining the competitive resource configuration information; if it is determined to initiate the resource request, send the resource request to a network device; receive a configuration response message sent by the network device; and obtain the competitive resource configuration information according to the configuration response message.

With reference to the first possible implementation manner of the fourth aspect, in a second possible implementation manner of the fourth aspect, the configuration information obtaining module is specifically configured to: determine, according to a resource request indication, to initiate the resource request, where the resource request indication is preconfigured in the apparatus or pre-sent by the network device to the apparatus; or determine, according to a type of a communication service, whether to initiate the resource request; or when it is detected that the apparatus is currently in coverage of a wireless signal of the network device, determine to initiate the resource request; or measure a load amount of a current competitive resource, and when the load amount is greater than a first preset load threshold, determine to initiate the resource request.

With reference to the fourth aspect, in a third possible implementation manner of the fourth aspect, the configuration information obtaining module is further configured to: obtain the competitive resource configuration information from preconfigured resource configuration information; or obtain the competitive resource configuration information according to an activation time of a communication service; or receive a broadcast message of a network device, and obtain the competitive resource configuration information from the broadcast message; or measure load amounts of multiple candidate resources, and obtain the competitive resource configuration information according to a measurement result.

With reference to the third possible implementation manner of the fourth aspect, in a fourth possible implementation manner of the fourth aspect, the configuration information obtaining module is further configured to: if it is determined that a load amount of a first candidate resource in the multiple candidate resources is less than a second preset load threshold, determine resource information of the first candidate resource as the competitive resource configuration information; or determine resource information of a candidate resource with a minimum load amount in the multiple candidate resources as the competitive resource configuration information.

With reference to the third possible implementation manner of the fourth aspect, in a fifth possible implementation manner of the fourth aspect, the configuration information obtaining module is further configured to: measure an amount of data received on the competitive resource; or measure strength of a signal received on the competitive resource; or measure duration of specified strength of a signal received on the competitive resource, where the specified signal strength refers to signal strength higher than a preset strength threshold; or measure a transmission rate of data received on the competitive resource; or measure duration of a specified transmission rate of data received on the competitive resource, where the specified data transmission rate refers to a data transmission rate higher than a preset transmission rate threshold.

With reference to the fourth aspect, in a sixth possible implementation manner of the fourth aspect, the sending module is configured to: send the communication service data on the competitive resource when the competitive resource determining module determines the competitive resource; or generate backoff duration after the competitive resource determining module determines the competitive resource, and send the communication service data after the backoff duration expires; or determine, after the competitive resource determining module determines the competitive resource, whether the competitive resource is idle, and send the communication service data if the competitive resource is idle; or generate backoff duration after the competitive resource determining module determines the competitive resource, determine, after the backoff duration expires, whether the competitive resource is idle, and send the communication service data if the competitive resource is idle.

With reference to the fourth aspect, in a seventh possible implementation manner of the fourth aspect, the competitive resource determining module is configured to: determine a configured competitive resource style according to the competitive resource configuration information, where the competitive resource style includes a distribution rule of multiple competitive resources; and determine the multiple competitive resources according to the distribution rule.

With reference to the seventh possible implementation manner of the fourth aspect, in an eighth possible implementation manner of the fourth aspect, the competitive resource style includes at least one of the following: a resource start location and a resource end location of the multiple competitive resources; or an allocation cycle of the multiple competitive resources, and at least one resource start location and at least one resource end location of each competitive resource in a corresponding allocation cycle; or an allocation cycle of the multiple competitive resources, and a resource start location and a resource length of each competitive resource in a corresponding allocation cycle.

With reference to the fourth aspect, in an eighth possible implementation manner of the fourth aspect, the sending module is configured to: send the communication service data on the competitive resource to another user equipment by using a wireless interface between the apparatus and the another user equipment, or send the communication service data on the competitive resource to a network device by using a wireless interface between the apparatus and the network device.

According to a fifth aspect, a resource measurement apparatus is provided. The apparatus includes a data obtaining module, configured to generate communication service data. The apparatus also includes a configuration information obtaining module, configured to obtain competitive resource configuration information used for sending the communication service data generated by the data obtaining module. The apparatus also includes a style configuration module, configured to determine a configured competitive resource style according to the competitive resource configuration information obtained by the configuration information obtaining module, where the competitive resource style includes a distribution rule of multiple competitive resources. The apparatus also includes a measurement module, configured to measure, according to the distribution rule, the multiple competitive resources determined by the style configuration module, to obtain a measurement result. The apparatus also includes a report module, configured to: determine whether to send a measurement result report to a network device; and if it is determined to send the measurement result report to the network device, send a measurement result report that includes the measurement result obtained by the measurement module to the network device.

With reference to the fifth aspect, in a first possible implementation manner of the fifth aspect, the measurement module is configured to: when the competitive resource style includes a resource start location and a resource end location of the multiple competitive resources, measure competitive resources between the resource start location and the resource end location, to obtain a measurement result; or when the competitive resource style includes an allocation cycle of the multiple competitive resources, and at least one resource start location and at least one resource end location of each competitive resource in a corresponding allocation cycle, for each allocation cycle, determine multiple competitive resources in the allocation cycle according to the at least one resource start location and the at least one resource end location in the allocation cycle, and measure the multiple competitive resources, to obtain a measurement result; or when the competitive resource style includes an allocation cycle of the multiple competitive resources, and a resource start location and a resource length of each competitive resource in a corresponding allocation cycle, for each allocation cycle, determine competitive resources in the allocation cycle according to the resource start location and the resource length in the allocation cycle, and measure the competitive resources, to obtain a measurement result.

According to a sixth aspect, a data sending apparatus is provided. The apparatus includes: a resource configuration module, configured to configure a competitive resource for user equipment according to load amounts of multiple resources when the network device receives a resource request of the user equipment. The apparatus also includes a configuration message sending module, configured to send a configuration response message to the user equipment according to the competitive resource configured by the resource configuration module, so that the user equipment obtains competitive resource configuration information according to the configuration response message, determines, according to the competitive resource configuration information, the competitive resource configured for the user equipment, and sends generated communication service data on the competitive resource.

With reference to the sixth aspect, in a first possible implementation manner of the sixth aspect, the configuration message sending module is configured to: broadcast the configuration response message, so that the user equipment receives the configuration response message; or send the configuration response message to the user equipment in a unicast manner.

Beneficial effects of the technical solutions provided in the embodiments of the present invention are as follows. When generating communication service data, user equipment obtains competitive resource configuration information used for sending the communication service data, determines, according to the competitive resource configuration information, a competitive resource configured for the user equipment, and sends the communication service data on the competitive resource. Compared with a scenario in which all user equipments simultaneously use a same resource, in the embodiments of the present invention, competitive resources are respectively and flexibly configured for multiple user equipments that perform communication services. Therefore, a quantity of user equipments that simultaneously use a same competitive resource is reduced, and a problem of network congestion caused by a conflict occurring when multiple user equipments perform communication services is resolved. When the user equipment sends the data on the configured competitive resource, a probability of a conflict is reduced, and network congestion is relieved.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the present invention clearer, the following further describes the embodiments of the present invention in detail with reference to the accompanying drawings.

Figure 1:
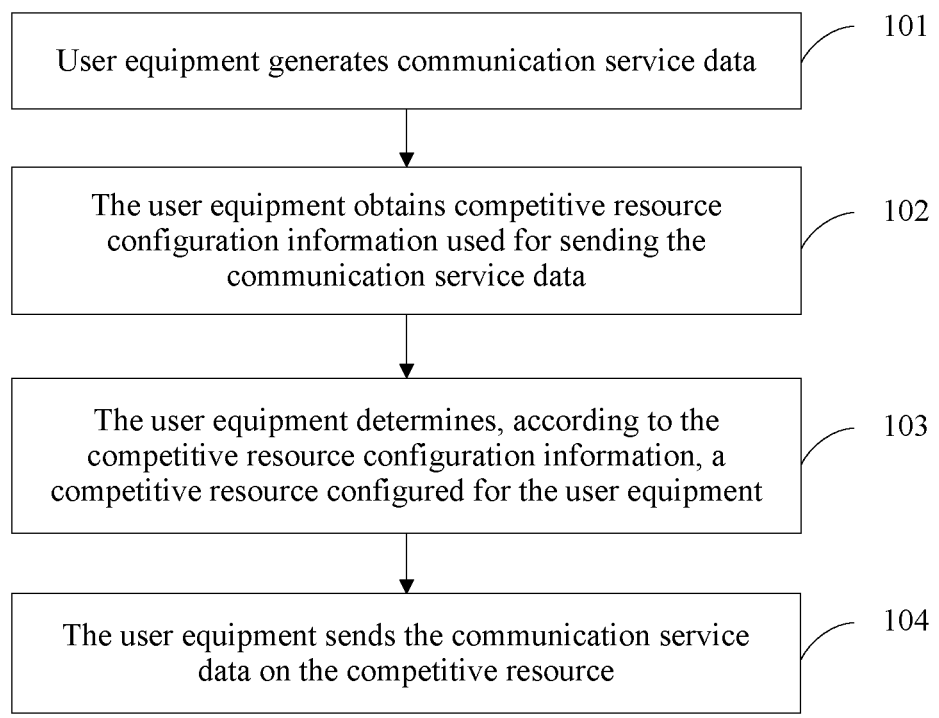
FIG. 1 is a schematic flowchart of a data sending method according to an embodiment of the present invention.

FIG. 1 is a schematic flowchart of a data sending method according to an embodiment of the present invention. Referring to FIG. 1, this embodiment of the present invention is executed by user equipment, and the method includes the following steps.

101. The user equipment generates communication service data.

102. The user equipment obtains competitive resource configuration information used for sending the communication service data.

103. The user equipment determines, according to the competitive resource configuration information, a competitive resource configured for the user equipment.

104. The user equipment sends the communication service data on the competitive resource.

According to the method provided in this embodiment of the present invention, when generating communication service data, user equipment obtains competitive resource configuration information used for sending the communication service data, determines, according to the competitive resource configuration information, a competitive resource configured for the user equipment, and sends the communication service data on the competitive resource. Compared with a scenario in which all user equipments simultaneously use a same resource, in this embodiment of the present invention, competitive resources are respectively and flexibly configured for multiple user equipments that perform communication services. Therefore, a quantity of user equipments that simultaneously use a same competitive resource is reduced, and a problem of network congestion caused by a conflict occurring when multiple user equipments perform communication services is resolved. When the user equipment sends the data on the configured competitive resource, a probability of a conflict is reduced, and network congestion is relieved.

Optionally, that the user equipment obtains competitive resource configuration information used for sending the communication service data further includes: the user equipment determines whether to initiate a resource request used for obtaining the competitive resource configuration information; the user equipment sends the resource request to a network device if it is determined to initiate the resource request; the user equipment receives a configuration response message sent by the network device; and the user equipment obtains the competitive resource configuration information according to the configuration response message.

Optionally, that the user equipment determines whether to initiate a resource request used for obtaining the competitive resource configuration information further includes at least one of the following: the user equipment determines, according to a resource request indication, to initiate the resource request, where the resource request indication is preconfigured on the user equipment or pre-sent by the network device to the user equipment; or the user equipment determines, according to a type of a communication service, whether to initiate the resource request; or when it is detected that the user equipment is currently in coverage of a wireless signal of the network device, the user equipment determines to initiate the resource request; or the user equipment measures a load amount of a current competitive resource, and when the load amount is greater than a first preset load threshold, the user equipment determines to initiate the resource request.

Optionally, that the user equipment obtains competitive resource configuration information used for sending the communication service data further includes: the user equipment obtains the competitive resource configuration information from resource configuration information preconfigured on the user equipment; or the user equipment obtains the competitive resource configuration information according to an activation time of a communication service; or the user equipment receives a broadcast message of a network device, and obtains the competitive resource configuration information from the broadcast message; or the user equipment measures load amounts of multiple candidate resources, and obtains the competitive resource configuration information according to a measurement result.

Optionally, that the user equipment obtains the competitive resource configuration information according to a measurement result further includes: if the user equipment determines that a load amount of a first candidate resource in the multiple candidate resources is less than a second preset load threshold, the user equipment determines resource information of the first candidate resource as the competitive resource configuration information; or the user equipment determines resource information of a candidate resource with a minimum load amount in the multiple candidate resources as the competitive resource configuration information.

Optionally, that the user equipment measures load amounts of multiple candidate resources further includes: the user equipment measures an amount of data received on the competitive resource; or the user equipment measures a strength of a signal received on the competitive resource; or the user equipment measures duration of specified strength of a signal received on the competitive resource, where the specified signal strength refers to signal strength higher than a preset strength threshold; or the user equipment measures a transmission rate of data received on the competitive resource; or the user equipment measures duration of a specified transmission rate of data received on the competitive resource, where the specified data transmission rate refers to a data transmission rate higher than a preset transmission rate threshold.

Optionally, that the user equipment sends the communication service data on the competitive resource further includes: the user equipment sends the communication service data on the competitive resource when determining the competitive resource; or the user equipment generates backoff duration after determining the competitive resource, and sends the communication service data after the backoff duration expires; or the user equipment determines, after determining the competitive resource, whether the competitive resource is idle, and sends the communication service data if the competitive resource is idle; or the user equipment generates backoff duration after determining the competitive resource, determines, after the backoff duration expires, whether the competitive resource is idle, and sends the communication service data if the competitive resource is idle.

Optionally, that the user equipment determines, according to the competitive resource configuration information, a competitive resource configured for the user equipment further includes: the user equipment determines, according to the competitive resource configuration information, a competitive resource style configured for the user equipment, where the competitive resource style includes a distribution rule of multiple competitive resources; and the user equipment determines the multiple competitive resources according to the distribution rule.

Optionally, the competitive resource style includes at least one of the following: a resource start location and a resource end location of the multiple competitive resources; or an allocation cycle of the multiple competitive resources, and at least one resource start location and at least one resource end location of each competitive resource in a corresponding allocation cycle; or an allocation cycle of the multiple competitive resources, and a resource start location and a resource length of each competitive resource in a corresponding allocation cycle.

Optionally, that the user equipment sends the communication service data on the competitive resource includes: the user equipment sends the communication service data on the competitive resource to another user equipment by using a wireless interface between the user equipment and the another user equipment; or the user equipment sends the communication service data on the competitive resource to a network device by using a wireless interface between the user equipment and the network device.

All the foregoing optional technical solutions may be randomly combined to form an optional embodiment of the present invention. Details are not repeatedly described herein.

Figure 2:
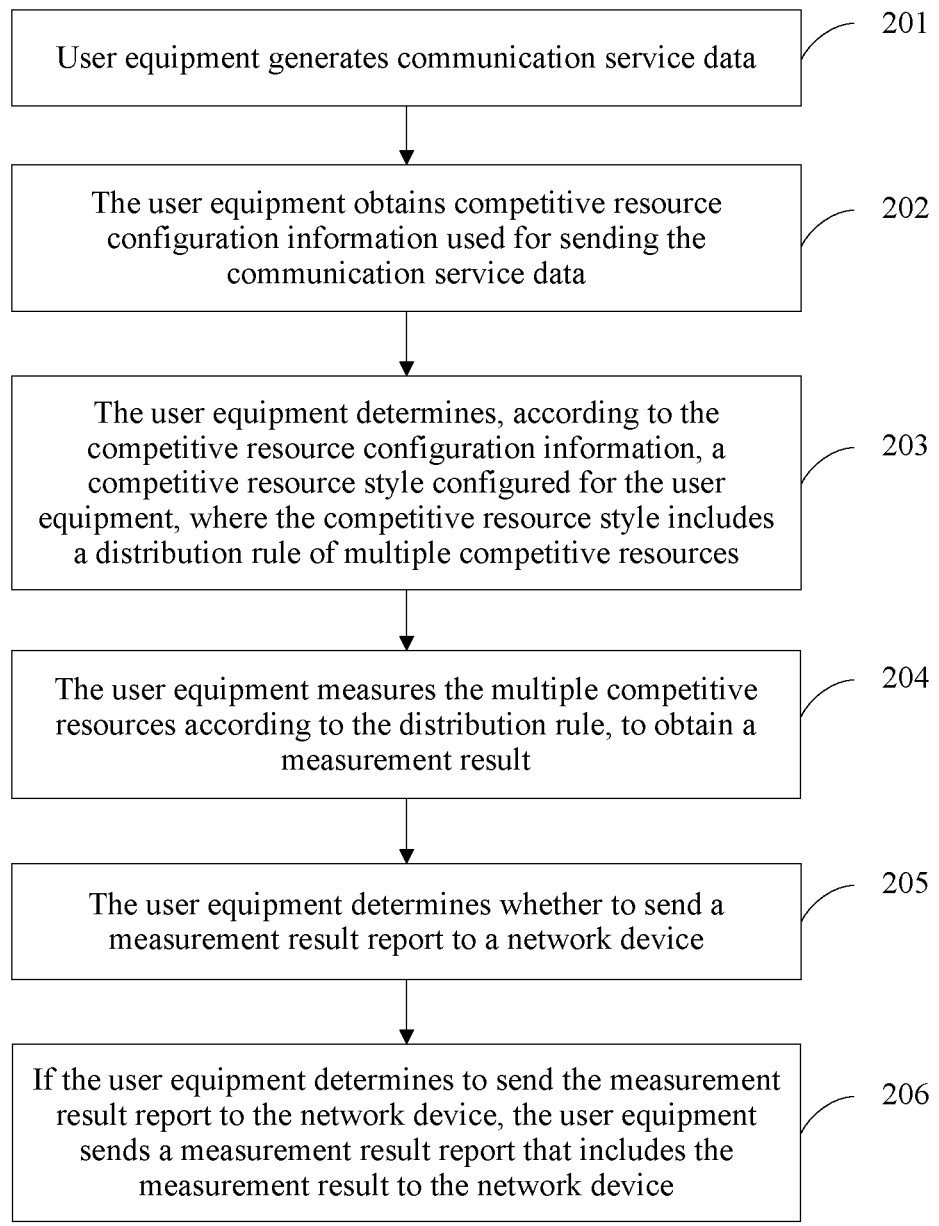
FIG. 2 is a schematic flowchart of a resource measurement method according to an embodiment of the present invention.

FIG. 2 is a schematic flowchart of a resource measurement method according to an embodiment of the present invention. Referring to FIG. 2, this embodiment of the present invention is executed by user equipment, and the method includes the following steps.

201. The user equipment generates communication service data.

202. The user equipment obtains competitive resource configuration information used for sending the communication service data.

203. The user equipment determines, according to the competitive resource configuration information, a competitive resource style configured for the user equipment, where the competitive resource style includes a distribution rule of multiple competitive resources.

204. The user equipment measures the multiple competitive resources according to the distribution rule, to obtain a measurement result.

205. The user equipment determines whether to send a measurement result report to a network device.

206. If the user equipment determines to send the measurement result report to the network device, the user equipment sends a measurement result report that includes the measurement result to the network device.

According to the method provided in this embodiment of the present invention, user equipment determines, according to obtained competitive resource configuration information, a competitive resource style configured for the user equipment, where the competitive resource style includes a distribution rule of multiple competitive resources. The user equipment may automatically measure the configured multiple competitive resources according to the distribution rule, to obtain a measurement result, that is, the user equipment does not need to measure only a current competitive resource each time. The user equipment sends a measurement result report that includes the measurement result to a network device, and the network device may receive a measurement result report sent by each user equipment, and can determine a load amount of each competitive resource according to the measurement result report.

Optionally, when the competitive resource style includes a resource start location and a resource end location of the multiple competitive resources, the user equipment measures competitive resources between the resource start location and the resource end location, to obtain a measurement result; or when the competitive resource style includes an allocation cycle of the multiple competitive resources, and at least one resource start location and at least one resource end location of each competitive resource in a corresponding allocation cycle, for each allocation cycle, the user equipment determines multiple competitive resources in the allocation cycle according to the at least one resource start location and the at least one resource end location in the allocation cycle, and measures the multiple competitive resources, to obtain a measurement result; or when the competitive resource style includes an allocation cycle of the multiple competitive resources, and a resource start location and a resource length of each competitive resource in a corresponding allocation cycle, for each allocation cycle, the user equipment determines competitive resources in the allocation cycle according to the resource start location and the resource length in the allocation cycle, and measures the competitive resources, to obtain a measurement result.

Figure 3:
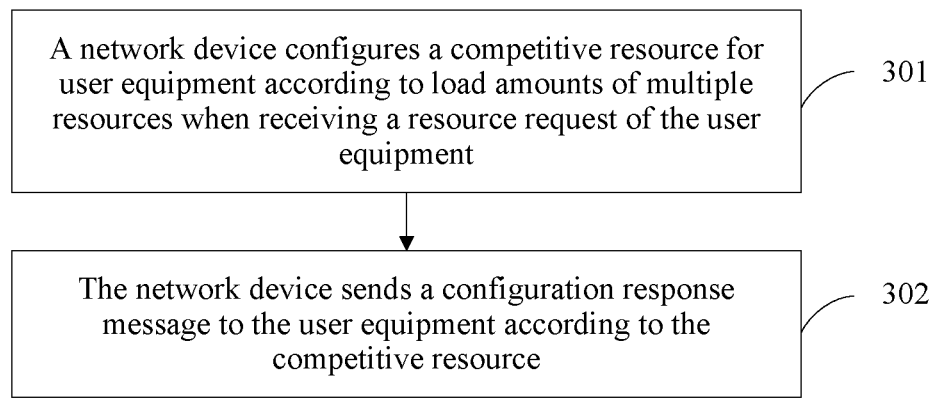
FIG. 3 is a schematic flowchart of a data sending method according to an embodiment of the present invention.

FIG. 3 is a schematic flowchart of a data sending method according to an embodiment of the present invention. Referring to FIG. 3, this embodiment of the present invention is executed by a network device, and the method includes the following steps.

301. The network device configures a competitive resource for user equipment according to load amounts of multiple resources when receiving a resource request of the user equipment.

302. The network device sends a configuration response message to the user equipment according to the competitive resource, so that the user equipment obtains competitive resource configuration information according to the configuration response message, determines, according to the competitive resource configuration information, the competitive resource configured for the user equipment, and sends generated communication service data on the competitive resource.

According to the method provided in this embodiment of the present invention, a network device configures a competitive resource for user equipment according to load amounts of multiple resources when receiving a resource request of the user equipment, so that the network device can flexibly configure competitive resources for multiple user equipments that perform communication services. Compared with a scenario in which all user equipments simultaneously use a same resource, in this embodiment of the present invention, competitive resources are respectively configured for multiple user equipments that perform communication services. Therefore, a quantity of user equipments that simultaneously use a same competitive resource is reduced, and a problem of network congestion caused by a conflict occurring when multiple user equipments perform communication services is resolved. When the user equipment sends data on the configured competitive resource, a probability of a conflict is reduced, and network congestion is relieved.

Optionally, that the network device sends a configuration response message to the user equipment according to the competitive resource further includes: the network device broadcasts the configuration response message, so that the user equipment receives the configuration response message; or the network device sends the configuration response message to the user equipment in a unicast manner.

Figure 4:
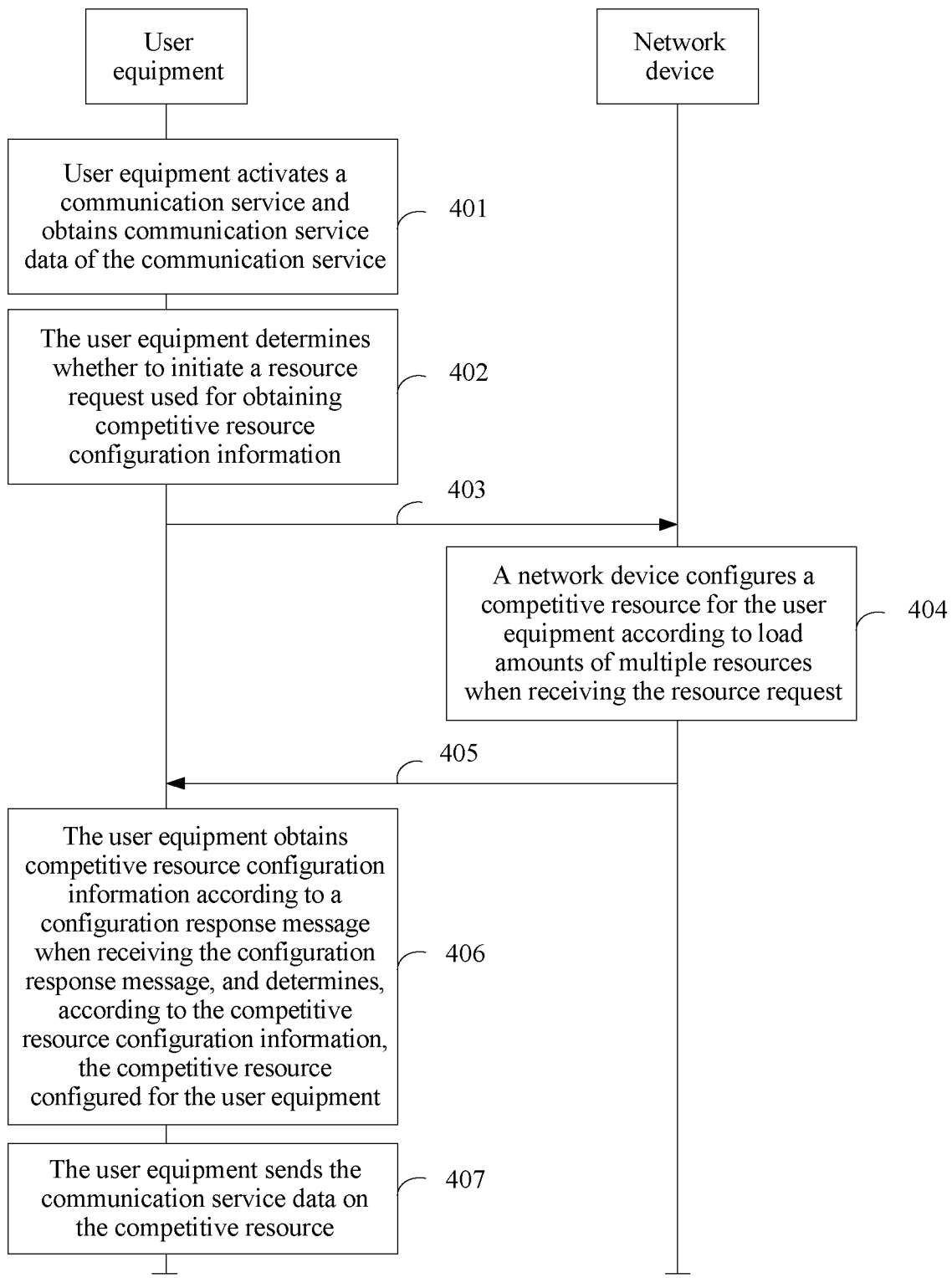
FIG. 4 is a schematic flowchart of a data sending method according to an embodiment of the present invention.

FIG. 4 is a schematic flowchart of a data sending method according to an embodiment of the present invention. Referring to FIG. 4, this embodiment of the present invention is executed by user equipment and a network device, and this embodiment of the present invention is described by using an example in which the user equipment sends a resource request to the network device and the network device configures a competitive resource for the user equipment. The method includes the following steps.

401. The user equipment activates a communication service and obtains communication service data of the communication service.

In this embodiment of the present invention, the user equipment may be a vehicular device, a mobile phone, a tablet computer, or the like, and the network device may be a base station, a server, a router, or the like. This is not limited in this embodiment of the present invention. The communication service may be a vehicle safety communication service, for example, a service of performing communication between a vehicle A and a vehicle B, or may be a voice conversation service, for example, a service of performing a voice conversation between a mobile phone C and a mobile phone D. This embodiment of the present invention sets no limitation on the communication service. Correspondingly, the communication service data may be traffic condition data that needs to be sent by the vehicle A to the vehicle B, voice data that needs to be sent by the mobile phone C to the mobile phone D, or the like. This embodiment of the present invention sets no limitation on the communication service data.

In this embodiment of the present invention, the user equipment may activate the communication service when detecting that a user activates the communication service, or may activate the communication service when receiving data sent by another user equipment. Alternatively, the communication service may be automatically activated when the user equipment enters coverage of a wireless signal of a network device, or the user equipment may automatically activate the communication service, for example, in a vehicle communication environment, the user equipment automatically activates a vehicle communication service after a vehicle is started. This is not limited in this embodiment of the present invention.

To process the communication service, the user equipment may need to send the communication service data to the network device or another user equipment. In this case, the user equipment first needs to determine an available resource, and then sends the data on the resource.

402. The user equipment determines whether to initiate a resource request used for obtaining competitive resource configuration information.

In this embodiment of the present invention, the competitive resource configuration information is used for determining a competitive resource. The user equipment may obtain the competitive resource configuration information according to resource configuration information preconfigured on the user equipment, or send the resource request used for obtaining the competitive resource configuration information to the network device, obtain a configuration response message sent by the network device, and determine the competitive resource configuration information according to the configuration response message.

The resource configuration information may be preset on the user equipment or may be sent by the network device to the user equipment. For example, the resource configuration information is set on the user equipment before delivery from a factory. Alternatively, the network device sends the resource configuration information to the user equipment in a unicast manner, and the user equipment receives the resource configuration information. Alternatively, the network device broadcasts the resource configuration information, and the user equipment receives the resource configuration information broadcast by the network device. Dedicated signaling may be sent to each user equipment in a broadcast manner, so that overheads of the dedicated signaling are reduced. In addition, when receiving the resource configuration information sent by the network device, the user equipment stores the resource configuration information. In this case, the user equipment may send a configuration information receiving message to the network device, to notify the network device that the user equipment has received the resource configuration information.

Further, the resource configuration information includes multiple pieces of information, for example, configuration information of each competitive resource, and a load amount that is of each competitive resource and that needs to be measured. Each piece of information may be preset on the user equipment, or may be sent by the network device to the user equipment. Different pieces of information in the resource configuration information may have different setting manners. This is not limited in this embodiment of the present invention.

Specifically, step 402 may include any one of the following steps (1) to (4).

(1). The user equipment determines, according to a resource request indication, to initiate the resource request, where the resource request indication is preconfigured on the user equipment or pre-sent by the network device to the user equipment. The resource request indication may be specified data or another type of identifier in the resource configuration information, and the resource request indication may be preconfigured on the user equipment, or may be pre-sent by the network device to the user equipment. This is not limited in this embodiment of the present invention. When the resource configuration information of the user equipment includes the resource request indication, it indicates that the user equipment needs to initiate the resource request.

(2). The user equipment determines, according to a type of the communication service, whether to initiate the resource request.

A type of a communication service for which the resource request needs to be initiated may be further specified in the resource configuration information. When the type of the communication service belongs to the type specified in the resource configuration information, the user equipment determines to initiate the resource request. The specified type is used as an example. When the resource configuration information includes the specified type, it indicates that the resource request is initiated when an activated communication service belongs to the specified type. The user equipment determines whether the communication service belongs to the specified type. When the communication service belongs to the specified type, the user equipment determines to initiate the resource request.

(3). When it is detected that the user equipment is currently in coverage of a wireless signal of the network device, the user equipment determines to initiate the resource request. Further, when it is detected that the user equipment is currently in coverage of a wireless signal of the network device, and the network device can configure a competitive resource for the user equipment, the user equipment determines to initiate the resource request to the network device.

(4). The user equipment measures a load amount of a current competitive resource, and when the load amount is greater than a first preset load threshold, the user equipment determines to initiate the resource request.

The load amount may be a data amount, signal strength, a data transmission rate, or the like on the current competitive resource, and may be determined according to a load parameter that needs to be measured and is included in the resource configuration information. This is not limited in this embodiment of the present invention.

The user equipment may measure the load amount of the current competitive resource. When it is determined that the load amount is greater than the first preset load threshold, the user equipment may consider that the current competitive resource is in a busy state, and determine to initiate the resource request, so as to determine the competitive resource configuration information, and determine, according to the competitive resource configuration information, another competitive resource different from the current competitive resource.

403. The user equipment sends the resource request to the network device when determining to initiate the resource request. The resource request is used to request the network device to configure a competitive resource for the user equipment.

In this embodiment of the present invention, the resource request may be one message, or may be multiple messages. This is not limited in this embodiment of the present invention. The resource request may include at least one of the following: a user equipment identifier, a reason for requesting a competitive resource, a service type, a user equipment type, a protocol type, or a protocol version. The user equipment identifier is used to uniquely determine the user equipment, and may be an equipment number, a user serial number, a user account, or the like of the user equipment. The reason for requesting a competitive resource may be vehicle communication, safety communication, vehicle-to-vehicle communication, or the like. The service type refers to the type of the communication service, and may be a vehicle safety service, a voice conversion service, a vehicle-to-vehicle communication service, or the like. The user equipment type refers to a type of the user equipment, and may be a pedestrian, a vehicle, an ambulance, or the like. The protocol type refers to a type of a protocol used by the resource request, and may be the European standard or the American standard. The protocol version refers to a version of the protocol, for example, version 1.2, version 1.3 or the like of the protocol. Certainly, the resource request may further include other information. This is not limited in this embodiment of the present invention.

Before interacting with the network device, the user equipment needs to initiate a random access process to access the network device, so that the user equipment can send the resource request to the network device in the random access process or after the random access process. Specifically, the user equipment may initiate the random access process after determining to initiate the resource request. In the random access process, the user equipment determines a transmission resource configured by the network device for the user equipment, and sends the resource request to the network device on the transmission resource. Alternatively, the user equipment initiates the random access process. After the random access process, the user equipment determines a transmission resource configured by the network device for the user equipment. If it is determined to initiate the resource request, the user equipment sends the resource request to the network device on the transmission resource.

It should be noted that, this embodiment of the present invention is described by using an example in which the user equipment determines to initiate the resource request. In practice, the user equipment may also determine not to initiate the resource request. In this case, the user equipment may directly obtain the competitive resource configuration information and determine the competitive resource. A specific process is described in detail in the following embodiment, and details are not described herein.

404. The network device configures a competitive resource for the user equipment according to load amounts of multiple resources when receiving the resource request.

In this embodiment of the present invention, the network device may obtain the load amounts of the multiple resources, and configure the competitive resource for the user equipment according to the load amounts of the multiple resources. The network device configures a competitive resource for each user equipment according to the load amounts of the multiple resources, so that time consumed for resource configuration is reduced, and a probability of a conflict between user equipments is reduced.

Optionally, the network device determines a currently idle resource, and configures the currently idle resource for the user equipment as the competitive resource of the user equipment. Alternatively, the network device measures a load amount of each resource, and configures a resource with a minimum load amount for the user equipment as the competitive resource of the user equipment. Alternatively, the network device measures a load amount of each resource, and configures a preset quantity of resources with a minimum load amount for the user equipment as competitive resources of the user equipment.

In this embodiment of the present invention, the network device may divide resources into multiple resource units. The multiple resource units may be divided in a unit of frame, that is, one frame is used as one resource unit, or may be divided in a unit of subframe, that is, one subframe is used as one resource unit. This is not limited in this embodiment of the present invention. The network device may allocate one resource unit or multiple resource units to the user equipment. Further, the network device may periodically allocate competitive resources. In each cycle, the network device may allocate consecutive competitive resources or allocate inconsecutive competitive resources to the user equipment. This is not limited in this embodiment of the present invention.

In addition, the competitive resource may include a time-frequency resource determined according to a wireless frame structure, and the time-frequency resource includes a time-domain dimension and a frequency-domain dimension. For example, a time dimension is determined according to a wireless frame number or a subframe number, a frequency dimension is determined according to a physical resource block index, and finally, a time-frequency resource in a wireless frame or a time-frequency resource in a subframe is determined.

405. The network device sends a configuration response message to the user equipment according to the competitive resource.

After determining the competitive resource that needs to be configured for the user equipment, the network device sends the configuration response message to the user equipment according to the competitive resource. The network device may send the configuration response message to the user equipment in a unicast manner, or may broadcast the configuration response message, and the user equipment receives the broadcast configuration response message. The user equipment may determine, according to the configuration response message, the resource configured by the network device for the user equipment.

Further, when the network device configures multiple competitive resources for the user equipment, the configuration response message may include a competitive resource style, and the competitive resource style includes a distribution rule of the multiple competitive resources. The user equipment may determine the multiple competitive resources according to the distribution rule.

When the network device configures consecutive competitive resources for the user equipment, the competitive resource style may include a resource start location and a resource end location. The resource start location is used to represent a start location of the configured competitive resources, the competitive resource end location is used to represent an end location of the competitive resources, and resources between the resource start location and the resource end location are the competitive resources configured by the network device. Alternatively, the competitive resource style may include a resource start location and a resource length. The resource length is used to represent a length of the configured competitive resources, and resources that start from the resource start location and correspond to the resource length are the competitive resources configured by the network device.

When the network device configures consecutive competitive resources for the user equipment in each cycle, the competitive resource style may include an allocation cycle of the multiple competitive resources, and at least one resource start location and at least one resource end location of each competitive resource in a corresponding allocation cycle. For each allocation cycle, resources between each resource start location and a corresponding resource end location in the allocation cycle are the competitive resources configured by the network device in the allocation cycle.

When all resources in each cycle are allocated to the user equipment, the configuration response message may include only the allocation cycle, and the allocation cycle is used to represent a cycle of the consecutive competitive resources. When not all resources in each cycle are allocated to the user equipment, the configuration response message may include the allocation cycle, the resource start location, and the resource end location. This is not limited in this embodiment of the present invention.

Figure 5A:
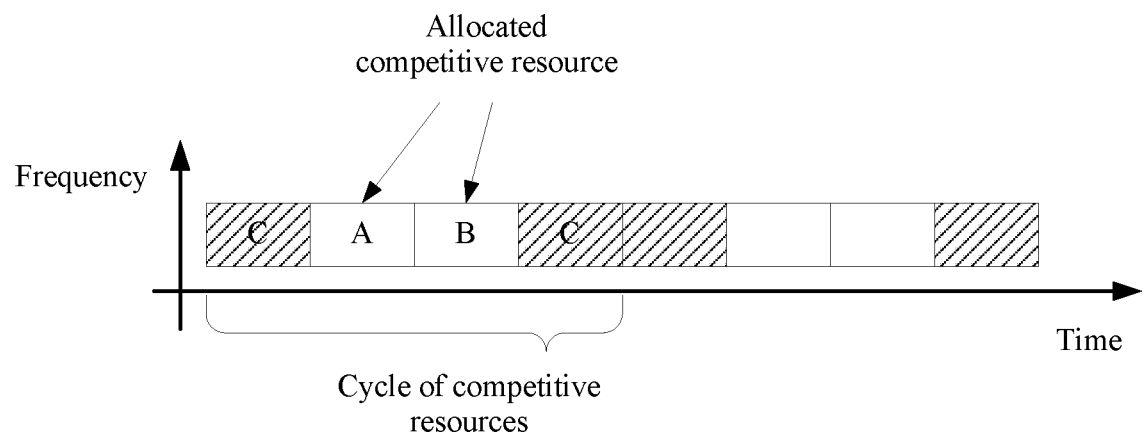
FIG. 5A is a schematic diagram of competitive resources according to an embodiment of the present invention.

Referring to FIG. 5A, a cycle of competitive resources is 4 resource units. In each cycle, a start location of the competitive resources is the second resource unit A, and an end location is the third resource unit B.

When the network device allocates inconsecutive competitive resources to the user equipment in each cycle, the configuration response message may include at least one of an allocation cycle of the multiple competitive resources, a wireless subframe location, or a wireless resource block location. The wireless subframe location is used to represent a location of a wireless subframe configured for the user equipment, and may be a number of the wireless subframe or the like. The wireless resource block location is used to represent a location of a wireless resource block configured for the user equipment, and may be a number of the wireless resource block or the like. When the network device configures resources in a unit of wireless subframe, the competitive resource style may include the allocation cycle and the wireless subframe location. When the network device configures resources in a unit of wireless resource block, the competitive resource style may include the allocation cycle, the wireless subframe location, and the wireless resource block location. This is not limited in this embodiment of the present invention.

Figure 5B:
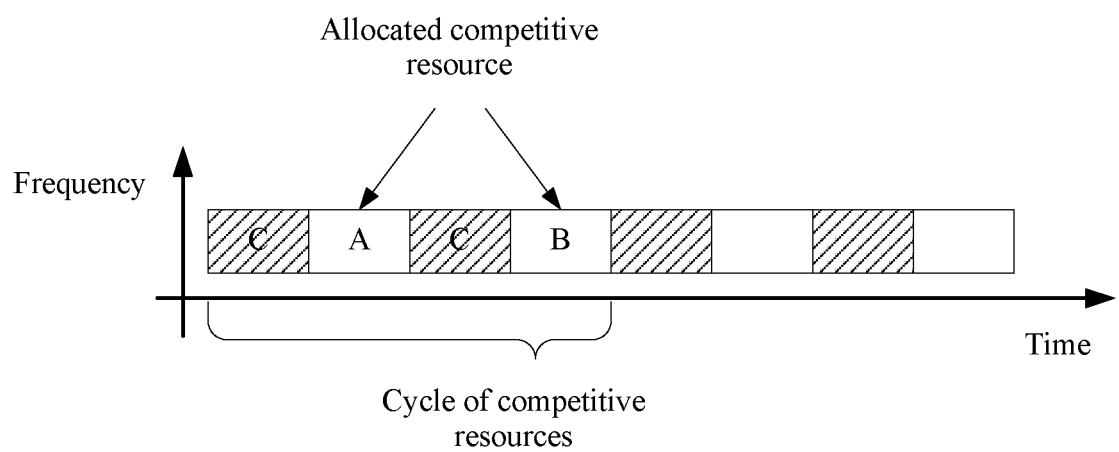
FIG. 5B is another schematic diagram of competitive resources according to an embodiment of the present invention.

Referring to FIG. 5B, the network device configures resources in a unit of wireless subframe. An allocation cycle of the competitive resources is 4 subframes, and locations of the competitive resources in each cycle are respectively 2 and 4, that is, the competitive resources configured for the user equipment in the cycle are a wireless subframe A and a wireless subframe B.

In this embodiment of the present invention, the network device may allocate the competitive resource style to the user equipment in a semi-static allocation manner. When the user equipment needs to send the communication service data, the network device configures an available competitive resource style for the user equipment. The competitive resource style includes a semi-static competitive resource. The user equipment may determine, according to the competitive resource style, multiple competitive resources configured for the user equipment, so that the network device does not need to allocate a competitive resource to the user equipment each time the user equipment generates communication service data, a delay of resource allocation is reduced, and signaling overheads for obtaining a resource by the user equipment are reduced.

406. The user equipment obtains competitive resource configuration information according to the configuration response message when receiving the configuration response message, and determines, according to the competitive resource configuration information, the competitive resource configured for the user equipment.

When the configuration response message includes an allocation cycle of competitive resources, and a start location and duration of competitive resources in each cycle, the user equipment may obtain a start location and an end location of the competitive resources by means of calculation by using the following formulas, so as to determine a corresponding competitive resource:

$$W1 = N\_\text{frame} \bmod T + \text{offset};$$

$$W2 = N\_\text{frame} \bmod T + \text{offset} + D; \text{ where}$$

W1 is used to represent the start location of the competitive resources, W2 is used to represent the end location of the competitive resources, N_frame represents a serial number of a current resource unit, T is used to represent the allocation cycle, offset is used to represent the start location of the competitive resources in each cycle, and D is used to represent the duration of the competitive resources in each cycle.

For each current resource unit, the user equipment may find, according to a serial number of a current resource unit by using the foregoing formulas, competitive resources in a cycle in which the current resource unit is located, and find competitive resources in each cycle according to the competitive resources in the current cycle and the cycle, so as to determine all competitive resources.

In practical application, when the configuration response message includes resource information of multiple competitive resources, the user equipment may directly use the resource information in the configuration response message as the competitive resource configuration information, or may screen the multiple competitive resources, and extract resource information of some competitive resources as the competitive resource configuration information. This is not limited in this embodiment of the present invention.

407. The user equipment sends the communication service data on the competitive resource.

In this embodiment of the present invention, the user equipment may send the communication service data to another user equipment, or may send the communication service data to the network device. Therefore, step 407 may include: the user equipment sends the communication service data on the competitive resource to another user equipment by using a wireless interface between the user equipment and the another user equipment, or the user equipment sends the communication service data on the competitive resource to the network device by using a wireless interface between the user equipment and the network device. This is not limited in this embodiment of the present invention.

In this embodiment of the present invention, the competitive resource style includes multiple competitive resources, and the multiple competitive resources have different start locations and different end locations, that is, the multiple competitive resources are in different time periods. When a current time arrives at a start location of the competitive resource, that is, when the competitive resource "appears", the user equipment may send the communication service data on the competitive resource.

Specifically, step 407 may include any one of the following.

(1). The user equipment sends the communication service data on the competitive resource when determining the competitive resource. When determining the competitive resource, the user equipment waits the competitive resource to "appear". When the competitive resource "appears", the user equipment may immediately send the communication service data on the competitive resource.

(2). The user equipment generates backoff duration after determining the competitive resource, and sends the communication service data after the backoff duration expires. When determining the competitive resource, the user equipment waits the competitive resource to "appear". When the competitive resource "appears", the user equipment may not send the communication service data immediately, but generate the backoff duration, and sends the communication service data after the backoff duration expires at the start location of the competitive resource.

(3). The user equipment determines, after determining the competitive resource, whether the competitive resource is idle, and sends the communication service data if the competitive resource is idle.

When determining the competitive resource, the user equipment waits the competitive resource to "appear". When the competitive resource "appears", the user equipment may first determine whether the competitive resource is idle. When the competitive resource is idle, the user equipment sends the communication service data on the competitive resource.

Specifically, when determining the competitive resource, the user equipment may invoke a listening mechanism to listen to the competitive resource. When the competitive resource "appears", the user equipment determines whether the competitive resource is idle. When determining that the competitive resource is idle, the user equipment may send the communication service data on the competitive resource. Alternatively, when determining that duration in which the competitive resource is idle exceeds preset duration, the user equipment may send the communication service data on the competitive resource. The preset duration may be determined by calculating time consumed by the user equipment for sending data. This is not limited in this embodiment of the present invention.

Further, when the competitive resource is busy, the user equipment may randomly generate backoff duration, and send the communication service data after the backoff duration expires at the start location of the competitive resource.

Furthermore, to avoid a conflict, the user equipment may be equipped with a backoff timer. When determining that the competitive resource is idle, the user equipment randomly generates a backoff time value, and stores the backoff time value in the backoff timer. The user equipment listens to a status of the competitive resource in each timeslot. When the competitive resource is idle, the time value in the backoff timer is decreased by 1. When the competitive resource is busy, the backoff timer is frozen, and a backoff process is delayed until the user equipment detects, by means of listening, that the competitive resource is idle, then the backoff timer is reactivated, and the backoff process continues. When the time value in the backoff timer is decreased to 0, the user equipment can send the communication service data on the competitive resource.

When multiple user equipments contend for the determined competitive resource, each user equipment sends data only after a backoff process of a random time value, so that a probability of a conflict is greatly reduced. In addition, user equipment whose backoff timer is frozen may not need to regenerate a new random time value in next-round contention, but only need to reactivate the backoff timer and continue to decrease a time value. User equipment that waits for a relatively long time sends data before user equipment that waits for a relatively short time sends data, and fairness between the user equipments that contend for the competitive resource is maintained.

(4). The user equipment generates backoff duration after determining the competitive resource, determines, after the backoff duration expires, whether the competitive resource is idle, and sends the communication service data if the competitive resource is idle.

The foregoing generating backoff duration may be randomly generating backoff duration, or may be generating backoff duration according to delay information of a service or congestion information of a network. For example, if backoff duration indicated by network congestion is 50 ms, backoff duration between 0 to 50 ms may be randomly generated, for example, 30 ms, that is, 30 ms is used as the backoff duration.

When determining the competitive resource, the user equipment waits the competitive resource to "appear". When the competitive resource "appears", the user equipment may randomly generate the backoff duration. After the backoff duration expires at the start location of the competitive resource, the user equipment determines whether the competitive resource is idle, and sends the communication service data if the competitive resource is idle.

In this embodiment of the present invention, an example in which the user equipment sends data when determining that the competitive resource is idle is used. However, in practical application, the competitive resource may always in a busy state, and the user equipment cannot obtain the competitive resource and cannot send data. When the user equipment waits for an excessively long time, data invalidation is easily caused. Especially for a service such as vehicle communication, when to-be-sent data includes emergent information such as traffic condition information or vehicle safety information, the data has a high requirement on a sending delay. Once data sending is delayed, not only data invalidation but also a vehicle safety problem may be caused; as a result, personal safety of a user is affected.

To avoid data sending delay, when determining that the competitive resource is busy, the user equipment sends a resource request to the network device, to request the network device to reallocate a competitive resource to the user equipment. When receiving the resource request, the network device reconfigures a competitive resource for the user equipment according to load amounts of current multiple resources, and sends another configuration response message to the user equipment according to the reconfigured competitive resource. When receiving the configuration response message, the user equipment determines, according to the configuration response message, the competitive resource configured for the user equipment at this time, and performs step 407 again on the competitive resource configured at this time, to send the communication service data.

To determine whether the competitive resource is busy, the method may further include at least one of the following steps (1) to (3).

(1). The user equipment measures an amount of data received on the competitive resource in first preset duration, and when the data amount exceeds a data amount threshold, the user equipment determines that the competitive resource is busy.

The competitive resource configuration information may further include the first preset duration and the data amount threshold. The user equipment may measure the amount of data received on the competitive resource in the first preset duration. When the data amount exceeds the data amount threshold, it indicates that a load of the competitive resource is heavy, and the user equipment determines that the competitive resource is busy.

(2). The user equipment measures strength of a wireless signal received on the competitive resource, and when the wireless signal strength exceeds a preset strength threshold, the user equipment determines that the competitive resource is busy. Alternatively, the user equipment measures strength of a wireless signal received on the competitive resource, and when duration in which the wireless signal strength exceeds a preset strength threshold reaches second preset duration, the user equipment determines that the competitive resource is busy. That is, the user equipment measures duration of specified strength of a signal received on the competitive resource, where the specified signal strength refers to signal strength higher than the preset strength threshold, and when the duration reaches the second preset duration, the user equipment determines that the competitive resource is busy.

The competitive resource configuration information may further include the preset strength threshold. The user equipment may measure the wireless signal strength on the competitive resource, and when the wireless signal strength exceeds the preset strength threshold, it indicates that another user equipment is occupying the competitive resource. If the user equipment sends data, signal interference may occur. Therefore, the user equipment may determine that the competitive resource is busy.

When determining that the wireless signal strength exceeds the preset strength threshold, the user equipment may further detect the duration in which the wireless signal strength exceeds the preset strength threshold. When the duration reaches the second preset duration, it indicates that another user equipment is occupying the competitive resource in the second preset duration. Therefore, the user equipment determines that the competitive resource is busy.

(3). The user equipment measures a data transmission rate that is on the competitive resource, and when the data transmission rate exceeds a rate threshold, the user equipment determines that the competitive resource is busy. Alternatively, the user equipment measures a data transmission rate that is on the competitive resource, and when duration in which the data transmission rate exceeds a rate threshold reaches third preset duration, the user equipment determines that the competitive resource is busy. That is, the user equipment measures duration of a specified transmission rate of data received on the competitive resource, where the specified transmission rate refers to a data transmission rate higher than a preset transmission rate threshold, and when the duration reaches the third preset duration, the user equipment determines that the competitive resource is busy.

The competitive resource configuration information may further include the rate threshold. The user equipment may measure the data transmission rate that is on the competitive resource. When the data transmission rate exceeds the rate threshold, it indicates that a load of the competitive resource is heavy, and the user equipment may determine that the competitive resource is busy.

When determining that the data transmission rate exceeds the rate threshold, the user equipment may further detect the duration in which the data transmission rate exceeds the rate threshold, and when the duration reaches the third preset duration, it indicates that a load of the competitive resource in the third preset duration is heavy, and the user equipment determines that the competitive resource is busy.

In this embodiment of the present invention, data amount measurement, wireless signal strength measurement, and data transmission rate measurement are merely used as examples for description. In practice, the user equipment may further measure another load parameter, to determine whether the competitive resource is busy. This embodiment of the present invention sets no limitation on a load parameter measured by the user equipment.

Further, the user equipment may determine only whether a competitive resource in one cycle is busy, or may determine a busy state of competitive resources in multiple cycles. This is not limited in this embodiment of the present invention. To estimate a status of a competitive resource more accurately, the user equipment may consider a load parameter measured before, and obtains a current load parameter by means of estimation by using the following formula:

$$L_n = (1-a) \cdot L_{n-1} + a \cdot M_n; \text{ where}$$

$L_n$ is used to represent a load parameter currently estimated, $L_{n-1}$ is used to represent a load parameter estimated at a previous time, $M_n$ is used to represent a load parameter currently measured, and a is used to represent a load estimation coefficient.

In this embodiment of the present invention, the network device is used as a resource configuration center, and is configured to control resource configuration. The network device can flexibly allocate a competitive resource to each user equipment according to load amounts of current wireless resources, so that a quantity of user equipments that simultaneously use a same competitive resource is reduced. When the user equipment sends data based on the competitive resource, a probability of a conflict is reduced.

According to the method provided in this embodiment of the present invention, when generating communication service data, user equipment obtains competitive resource configuration information used for sending the communication service data, determines, according to the competitive resource configuration information, a competitive resource configured for the user equipment, and sends the communication service data on the competitive resource. Compared with a scenario in which all user equipments simultaneously use a same resource, in this embodiment of the present invention, competitive resources are respectively and flexibly configured for multiple user equipments that perform communication services. Therefore, a quantity of user equipments that simultaneously use a same competitive resource is reduced, and a problem of network congestion caused by a conflict occurring when multiple user equipments perform communication services is resolved. When the user equipment sends the data on the configured competitive resource, a probability of a conflict is reduced, and network congestion is relieved.

Figure 6:
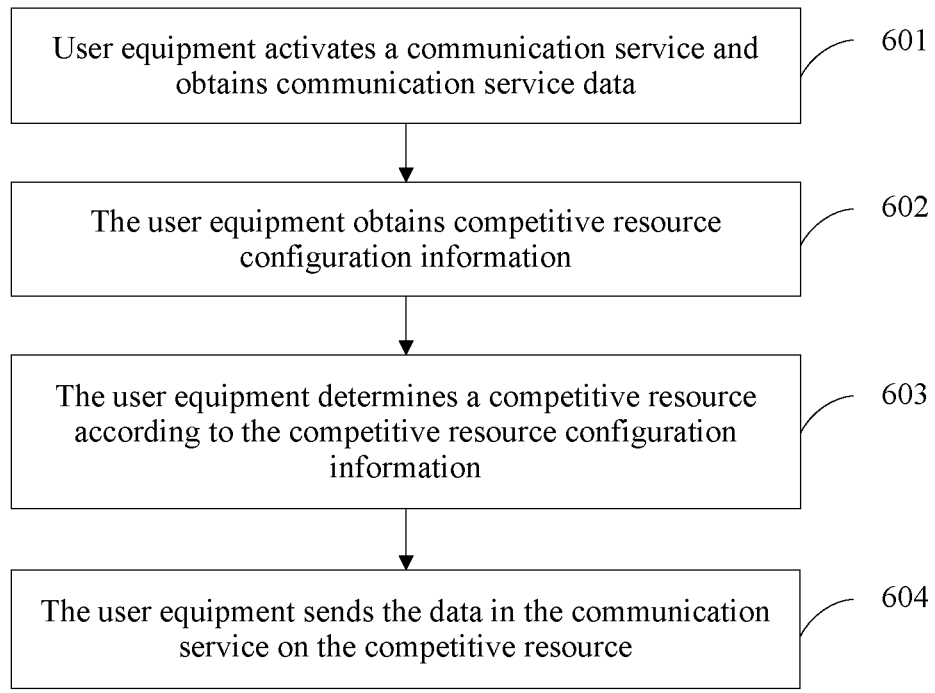
FIG. 6 is a schematic flowchart of a data sending method according to an embodiment of the present invention.

FIG. 6 is a schematic flowchart of a data sending method according to an embodiment of the present invention. Referring to FIG. 6, this embodiment of the present invention is executed by user equipment, and this embodiment of the present invention is described by using an example in which the user equipment determines a competitive resource. The method includes the following steps.

601. The user equipment activates a communication service and obtains communication service data.

Step 601 is similar to step 401, and details are not described herein.

602. The user equipment obtains competitive resource configuration information.

When the user equipment is not in coverage of a wireless signal of a network device, or if the user equipment does not need to initiate a resource request, the user equipment may determine a competitive resource.

Specifically, step 602 may include any one of the following steps 602*a* to 602*d*.

602*a*. The user equipment obtains the competitive resource configuration information from resource configuration information preconfigured on the user equipment. The resource configuration information may include a start location and duration of competitive resources, and the user equipment may directly obtain the competitive resource configuration information according to the start location and the duration. When the resource configuration information includes a user equipment identifier rather than the start location, the user equipment may determine the start location according to the user equipment identifier, so as to obtain the competitive resource configuration information.

Specifically, the user equipment may perform a modulo operation between the user equipment identifier and a quantity of resource units in each cycle, and uses an obtained remainder as the start location of the competitive resources.

Figure 7A:
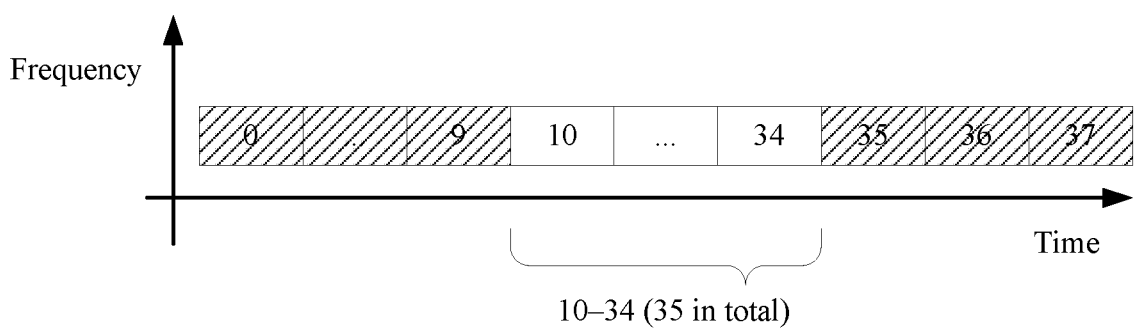
FIG. 7A is a schematic diagram of competitive resources according to an embodiment of the present invention.

Referring to FIG. 7A, the user equipment identifier is 110, the user equipment determines, according to a service delay requirement, that a cycle of the competitive resources is 100 ms, and there are 100 subframes in 100 ms. The user equipment performs a modulo operation between the user equipment identifier and a quantity of subframes in each cycle, and an obtained remainder is 10. Therefore, the user equipment determines that a start location of competitive resources in a cycle is 10. Assuming that duration of the competitive resources is 25 ms, it may be determined that the competitive resources start from the $10^{th}$ subframe and end at the $35^{th}$ subframe in a cycle.

602*b*. The user equipment obtains the competitive resource configuration information according to an activation time of the communication service. Specifically, the user equipment may use the activation time of the communication service as a start location of the competitive resource, and determine the competitive resource according to the start location and the duration in the resource configuration information.

602*c*. The user equipment receives a broadcast message of a network device, and obtains the competitive resource configuration information from the broadcast message. The network device may broadcast the competitive resource configuration information, and the user equipment may receive the competitive resource configuration information broadcast by the network device.

602*d*. The user equipment measures load amounts of multiple candidate resources, and obtains the competitive resource configuration information according to a measurement result.

The user equipment may send the communication service data on any candidate resource in the multiple candidate resources. However, to avoid a conflict, the user equipment may measure the load amounts of the multiple candidate resources. The load amounts may represent congestion statuses of the candidate resources. The user equipment may obtain the competitive resource configuration information according to the measurement result, so as to determine the competitive resource on which the communication service data is to be sent. That is, step 602*d* may include any one of the following steps (1), (2), and (3).

(1). The user equipment measures the load amounts of the multiple candidate resources.

The resource configuration information includes resource information of the multiple candidate resources. Resource information of each candidate resource includes at least one of: a time-domain resource length of the candidate resource, a frequency-domain resource width of the candidate resource, a wireless resource block location of the candidate resource, quantity information of the candidate resource, cycle information of the candidate resource, an interval between the candidate resource and another candidate resource, frequency channel number information of the candidate resource, or frequency band information of the candidate resource. This is not limited in this embodiment of the present invention. The user may determine locations of the multiple candidate resources according to the resource information of the multiple candidate resources, and measure the load amounts of the multiple candidate resources.

(2). For each candidate resource, the user equipment determines whether a load amount of the candidate resource is less than a second preset load threshold, and when the load amount of the candidate resource is less than the second preset load threshold, resource information of the candidate resource is determined as the competitive resource configuration information.

A first candidate resource is used as an example. The user equipment may set the second preset load threshold and determine whether a load amount of the first candidate resource is less than the second preset load threshold. When determining that the load amount of the first candidate resource is less than the second preset load threshold, the user equipment determines resource information of the first candidate resource as the competitive resource configuration information. When the load amount of the first candidate resource is not less than the second preset load threshold, the user equipment does not determine resource information of the first candidate resource as the competitive resource configuration information.

Further, when determining that the load amount of the first candidate resource is less than the second preset load threshold, the user equipment may obtain duration in which the load amount of the first candidate resource is less than the second preset load threshold. When the duration reaches preset duration, resource information of the first candidate resource is determined as the competitive resource configuration information.

(3). The user equipment sorts the multiple candidate resources in ascending order of load amounts, and determines resource information of a candidate resource with a minimum load amount in the multiple candidate resources as the competitive resource configuration information. Alternatively, the user equipment may further determine resource information of multiple candidate resources with a minimum load amount in the multiple candidate resources as the competitive resource configuration information.

Figure 7B:
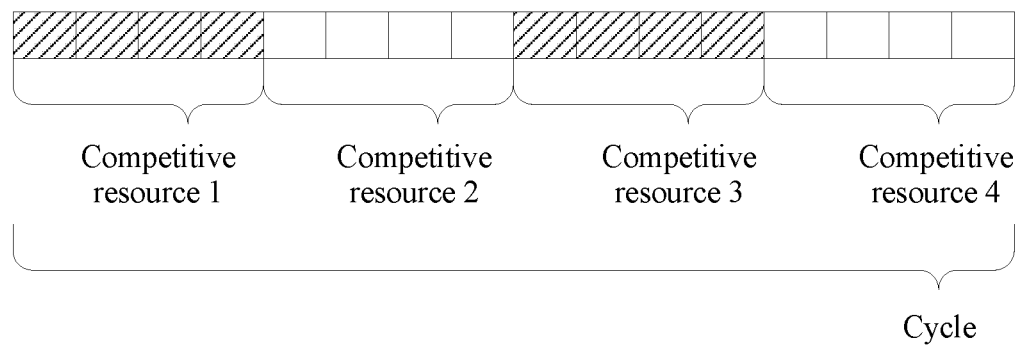
FIG. 7B is another schematic diagram of competitive resources according to an embodiment of the present invention.

Referring to FIG. 7B, the user equipment detects load amounts of candidate resources 1 to 4. When determining that a load amount of a candidate resource 2 is the minimum, the user equipment determines resource information of the candidate resource 2 as the competitive resource configuration information. Alternatively, when determining that a load amount of a candidate resource 2 and a load amount of a candidate resource 4 are less than a load amount of a candidate resource 1 and a load amount of a candidate resource 3, the user equipment determines resource information of the candidate resource 2 and resource information of the candidate resource 4 as the competitive resource configuration information.

It should be noted that, in the foregoing steps 602*a* to 602*d*, only four manners are used as examples for description. In practice, the user equipment may further obtain the competitive resource configuration information in another manner. For example, the user equipment may generate a random number, and use the random number as the start location of the competitive resources. The random number may be any value. This is not limited in this embodiment of the present invention.

603. The user equipment determines a competitive resource according to the competitive resource configuration information. Specifically, the user equipment obtains the competitive resource configuration information. The competitive resource configuration information includes a start location and duration of competitive resources, and the user equipment may determine the competitive resource according to the start location and the duration. Alternatively, when the competitive resource configuration information includes a start location and an end location of competitive resources, the user equipment may determine the competitive resource according to the start location and the end location.

604. The user equipment sends the data in the communication service on the competitive resource.

Step 604 is similar to step 407, and details are not described herein.

According to the method provided in this embodiment of the present invention, when generating communication service data, user equipment obtains competitive resource configuration information used for sending the communication service data, determines, according to the competitive resource configuration information, a competitive resource configured for the user equipment, and sends the communication service data on the competitive resource. Compared with a scenario in which all user equipments simultaneously use a same resource, in this embodiment of the present invention, competitive resources are respectively and flexibly configured for multiple user equipments that perform communication services. Therefore, a quantity of user equipments that simultaneously use a same competitive resource is reduced, and a problem of network congestion caused by a conflict occurring when multiple user equipments perform communication services is resolved. When the user equipment sends the data on the configured competitive resource, a probability of a conflict is reduced, and network congestion is relieved.

Figure 8:
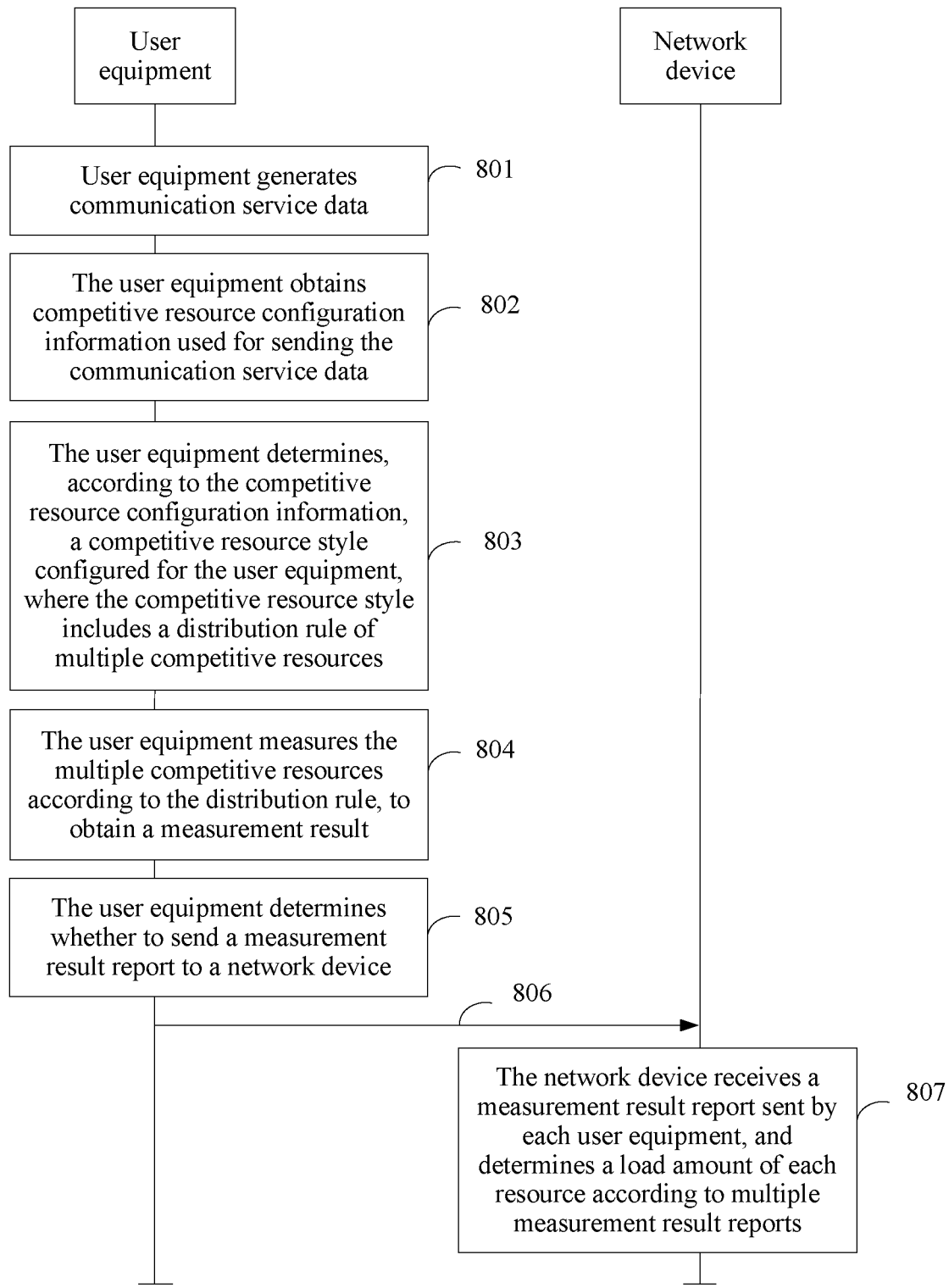
FIG. 8 is a schematic flowchart of a resource measurement method according to an embodiment of the present invention.

FIG. 8 is a schematic flowchart of a resource measurement method according to an embodiment of the present invention. Referring to FIG. 8, this embodiment of the present invention is executed by user equipment and a network device, and the method includes the following steps.

801. The user equipment generates communication service data.

802. The user equipment obtains competitive resource configuration information used for sending the communication service data.

803. The user equipment determines, according to the competitive resource configuration information, a competitive resource style configured for the user equipment, where the competitive resource style includes a distribution rule of multiple competitive resources.

The competitive resource configuration information includes the competitive resource style, and the competitive resource style includes the distribution rule of the multiple competitive resources. The distribution rule may represent a regularity with which the multiple competitive resources comply, for example, an allocation cycle of the competitive resources, or a start location and an end location of each competitive resource. Details are not described herein.

804. The user equipment measures the multiple competitive resources according to the distribution rule, to obtain a measurement result.

When obtaining the competitive resource style, the user equipment can not only determine a current competitive resource and measure the current competitive resource to obtain a measurement result of the current competitive resource, but also determine, according to the distribution rule, multiple competitive resources that are after the current competitive resource and that comply with the distribution rule. When a competitive resource that complies with the distribution rule "appears", the user equipment measures the competitive resource that complies with the distribution rule, to obtain a measurement result.

The user equipment obtains the competitive resource style at a time in advance, and may measure, according to the competitive resource style, multiple competitive resources that comply with the distribution rule. Therefore, the user equipment does not need to individually obtain configuration information of each competitive resource.

Step 804 may specifically include any one of the following steps (1) to (3).

(1). When the competitive resource style includes a resource start location and a resource end location of the multiple competitive resources, the user equipment measures competitive resources between the resource start location and the resource end location, to obtain a measurement result.

(2). When the competitive resource style includes an allocation cycle of the multiple competitive resources, and at least one resource start location and at least one resource end location of each competitive resource in a corresponding allocation cycle, for each allocation cycle, the user equipment determines multiple competitive resources in the allocation cycle according to the at least one resource start location and the at least one resource end location in the allocation cycle, and measures the multiple competitive resources, to obtain a measurement result.

(3). When the competitive resource style includes an allocation cycle of the multiple competitive resources, and a resource start location and a resource length of each competitive resource in a corresponding allocation cycle, for each allocation cycle, the user equipment determines competitive resources in the allocation cycle according to the resource start location and the resource length in the allocation cycle, and measures the competitive resources, to obtain a measurement result.

In addition, when measuring the competitive resource, the user equipment may measure a load amount such as an amount of data received on the competitive resource, strength of a signal received on the competitive resource, or a transmission rate of data received on the competitive resource, to obtain a measure result. The measurement result may represent a load amount of the competitive resource. This embodiment of the present invention sets no limitation on a measured load amount parameter.

805. The user equipment determines whether to send a measurement result report to a network device. The user equipment may determine, according to measurement configuration information preconfigured on the user equipment, whether to send the measurement result report to the network device. When the measurement configuration information includes a report indication, it indicates that the user equipment needs to send the measurement result report to the network device each time obtaining a measurement result of a competitive resource. Therefore, when obtaining the measurement result, the user equipment sends a measurement result report that includes the measurement result to the network device. Alternatively, the user equipment may further determine, according to a type of the communication service, whether to send the measurement result report to the network device. A type of a communication service for which a measurement result report needs to be sent may be specified in the measurement configuration information, and the user equipment may determine whether the type of the communication service is the type for which the measurement result report needs to be sent and that is specified in the measurement configuration information. If the type of the communication service is the type for which the measurement result report needs to be sent and that is specified in the measurement configuration information, the user equipment sends a measurement result report that includes the measurement result to the network device.

The user equipment may determine, according to measurement configuration information obtained from the network device, whether to send the measurement result report to the network device. Optionally, when a threshold of a measurement report has been configured in the measurement configuration information, and a measurement result obtained by the user equipment by measuring the competitive resource reaches the threshold of the measurement report, the user equipment sends a measurement result report that includes the measurement result.

Alternatively, the user equipment may determine, in another manner, whether to send the measurement result report. This is not limited in this embodiment of the present invention.

806. If the user equipment determines to send the measurement result report to the network device, the user equipment sends a measurement result report that includes the measurement result to the network device.

807. The network device receives a measurement result report sent by each user equipment, and determines a load amount of each resource according to multiple measurement result reports.

In this embodiment of the present invention, each user equipment may send a measurement result report to the network device after measuring a competitive resource. Therefore, the network device may receive measurement result reports obtained by multiple user equipments by measuring multiple resources, and may determine a load amount of each resource according to the multiple received measurement result reports. When the network device receives a resource request of any user equipment, because the network device has learned the load amount of each resource, the network device can configure a resource with a minimum load amount or a relatively small load amount for user equipment that sends the resource request, so as to avoid a probability of a conflict occurring when the user equipment sends the communication service data.

According to the method provided in this embodiment of the present invention, user equipment determines, according to obtained competitive resource configuration information, a competitive resource style configured for the user equipment, where the competitive resource style includes a distribution rule of multiple competitive resources. The user equipment may automatically measure the configured multiple competitive resources according to the distribution rule, to obtain a measurement result, that is, the user equipment does not need to measure only a current competitive resource each time. The user equipment sends a measurement result report that includes the measurement result to a network device, and the network device may receive a measurement result report sent by each user equipment, and can determine a load amount of each competitive resource according to the measurement result report. Therefore, when the network device subsequently configures a competitive resource for user equipment according to a load amount of each competitive resource, a probability of a conflict can be avoided.

Figure 9:
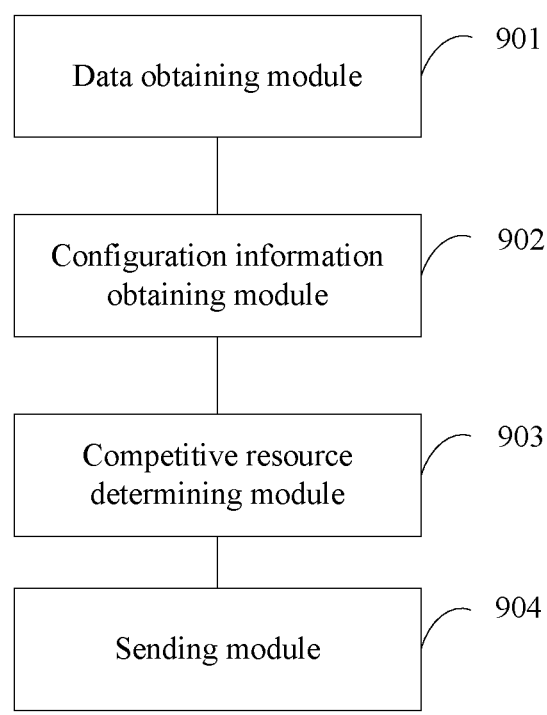
FIG. 9 is a schematic structural diagram of a data sending apparatus according to an embodiment of the present invention.

FIG. 9 is a schematic structural diagram of a data sending apparatus according to an embodiment of the present invention. Referring to FIG. 9, the apparatus includes: a data obtaining module 901, configured to generate communication service data; a configuration information obtaining module 902, configured to obtain competitive resource configuration information used for sending the communication service data generated by the data obtaining module 901; a competitive resource determining module 903, configured to determine, according to the competitive resource configuration information obtained by the configuration information obtaining module 902, a competitive resource configured for the user equipment; and a sending module 904, configured to send, on the competitive resource determined by the competitive resource determining module 903, the communication service data generated by the data obtaining module 901.

The apparatus provided in this embodiment of the present invention obtains, when generating communication service data, competitive resource configuration information used for sending the communication service data, determines, according to the competitive resource configuration information, a competitive resource configured for the apparatus, and sends the communication service data on the competitive resource. Compared with a scenario in which all apparatuses simultaneously use a same resource, in this embodiment of the present invention, competitive resources are respectively and flexibly configured for multiple apparatuses that perform communication services. Therefore, a quantity of apparatuses that simultaneously use a same competitive resource is reduced, and a problem of network congestion caused by a conflict occurring when multiple apparatuses perform communication services is resolved. When the apparatus sends the data on the configured competitive resource, a probability of a conflict is reduced, and network congestion is relieved.

Optionally, the configuration information obtaining module 902 is configured to: determine whether to initiate a resource request used for obtaining the competitive resource configuration information; if it is determined to initiate the resource request, send the resource request to a network device; receive a configuration response message sent by the network device; and obtain the competitive resource configuration information according to the configuration response message.

Optionally, the configuration information obtaining module 902 is specifically configured to: determine, according to a resource request indication, to initiate the resource request, where the resource request indication is preconfigured in the apparatus or pre-sent by the network device to the apparatus; or determine, according to a type of a communication service, whether to initiate the resource request; or when it is detected that the apparatus is currently in coverage of a wireless signal of the network device, determine to initiate the resource request; or measure a load amount of a current competitive resource, and when the load amount is greater than a first preset load threshold, determine to initiate the resource request.

Optionally, the configuration information obtaining module 902 is further configured to: obtain the competitive resource configuration information from preconfigured resource configuration information; or obtain the competitive resource configuration information according to an activation time of a communication service; or receive a broadcast message of a network device, and obtain the competitive resource configuration information from the broadcast message; or measure load amounts of multiple candidate resources, and obtain the competitive resource configuration information according to a measurement result.

Optionally, the configuration information obtaining module 902 is further configured to: if it is determined that a load amount of a first candidate resource in the multiple candidate resources is less than a second preset load threshold, determine resource information of the first candidate resource as the competitive resource configuration information; or determine resource information of a candidate resource with a minimum load amount in the multiple candidate resources as the competitive resource configuration information.

Optionally, the configuration information obtaining module 902 is further configured to: measure an amount of data received on the competitive resource; or measure strength of a signal received on the competitive resource; or measure duration of specified strength of a signal received on the competitive resource, where the specified signal strength refers to signal strength higher than a preset strength threshold; or measure a transmission rate of data received on the competitive resource; or measure duration of a specified transmission rate of data received on the competitive resource, where the specified data transmission rate refers to a data transmission rate higher than a preset transmission rate threshold.

Optionally, the sending module 904 is configured to: send the communication service data on the competitive resource when the competitive resource determining module 903 determines the competitive resource; or generate backoff duration after the competitive resource determining module 903 determines the competitive resource, and send the communication service data after the backoff duration expires; or determine, after the competitive resource determining module 903 determines the competitive resource, whether the competitive resource is idle, and send the communication service data if the competitive resource is idle; or generate backoff duration after the competitive resource determining module 903 determines the competitive resource, determine, after the backoff duration expires, whether the competitive resource is idle, and send the communication service data if the competitive resource is idle.

Optionally, the competitive resource determining module 903 is configured to: determine a configured competitive resource style according to the competitive resource configuration information, where the competitive resource style includes a distribution rule of multiple competitive resources; and determine the multiple competitive resources according to the distribution rule.

Optionally, the competitive resource style includes at least one of the following: a resource start location and a resource end location of the multiple competitive resources; or an allocation cycle of the multiple competitive resources, and at least one resource start location and at least one resource end location of each competitive resource in a corresponding allocation cycle; or an allocation cycle of the multiple competitive resources, and a resource start location and a resource length of each competitive resource in a corresponding allocation cycle.

Optionally, the sending module 904 is configured to: send the communication service data on the competitive resource to another user equipment by using a wireless interface between the apparatus and the another user equipment, or send the communication service data on the competitive resource to a network device by using a wireless interface between the apparatus and the network device.

All the foregoing optional technical solutions may be randomly combined to form an optional embodiment of the present invention. Details are not repeatedly described herein.

Figure 10:
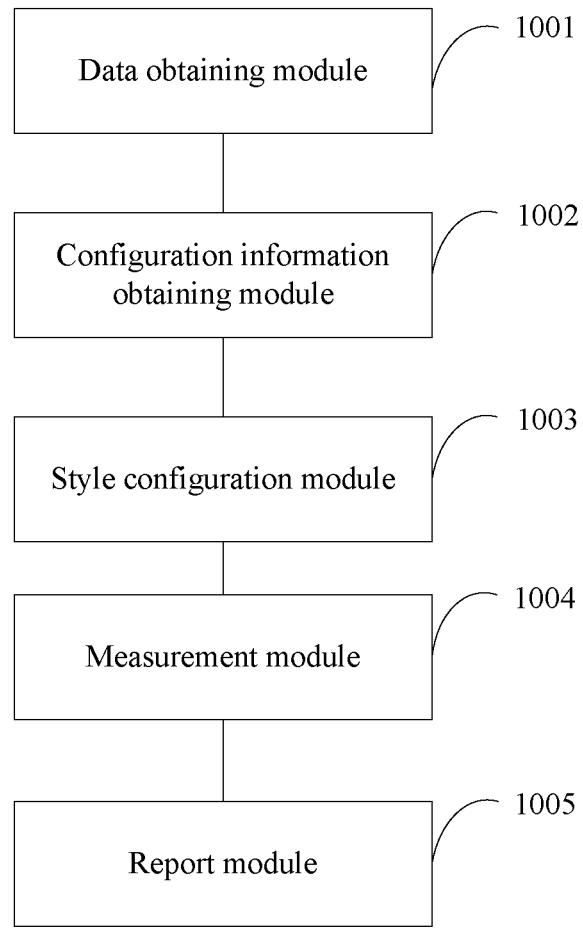
FIG. 10 is a schematic structural diagram of a resource measurement apparatus according to an embodiment of the present invention.

FIG. 10 is a schematic structural diagram of a resource measurement apparatus according to an embodiment of the present invention. Referring to FIG. 10, the apparatus includes: a data obtaining module 1001, configured to generate communication service data; a configuration information obtaining module 1002, configured to obtain competitive resource configuration information used for sending the communication service data generated by the data obtaining module 1001; a style configuration module 1003, configured to determine a configured competitive resource style according to the competitive resource configuration information obtained by the configuration information obtaining module 1002, where the competitive resource style includes a distribution rule of multiple competitive resources; a measurement module 1004, configured to measure, according to the distribution rule, the multiple competitive resources determined by the style configuration module 1003, to obtain a measurement result; and a report module 1005, configured to: determine whether to send a measurement result report to a network device; and if it is determined to send the measurement result report to the network device, send a measurement result report that includes the measurement result obtained by the measurement module 1004 to the network device.

The apparatus provided in this embodiment of the present invention determines, according to obtained competitive resource configuration information, a competitive resource style configured for the apparatus, where the competitive resource style includes a distribution rule of multiple competitive resources; the apparatus may automatically measure the configured multiple competitive resources according to the distribution rule, to obtain a measurement result, that is, the apparatus does not need to measure only a current competitive resource each time; the apparatus sends a measurement result report that includes the measurement result to a network device; and the network device may receive a measurement result report sent by each apparatus, and can determine a load amount of each competitive resource according to the measurement result report.

Optionally, the measurement module 1004 is configured to: when the competitive resource style includes a resource start location and a resource end location of the multiple competitive resources, measure competitive resources between the resource start location and the resource end location, to obtain a measurement result; or when the competitive resource style includes an allocation cycle of the multiple competitive resources, and at least one resource start location and at least one resource end location of each competitive resource in a corresponding allocation cycle, for each allocation cycle, determine multiple competitive resources in the allocation cycle according to the at least one resource start location and the at least one resource end location in the allocation cycle, and measure the multiple competitive resources, to obtain a measurement result; or when the competitive resource style includes an allocation cycle of the multiple competitive resources, and a resource start location and a resource length of each competitive resource in a corresponding allocation cycle, for each allocation cycle, determine competitive resources in the allocation cycle according to the resource start location and the resource length in the allocation cycle, and measure the competitive resources, to obtain a measurement result.

Figure 11:
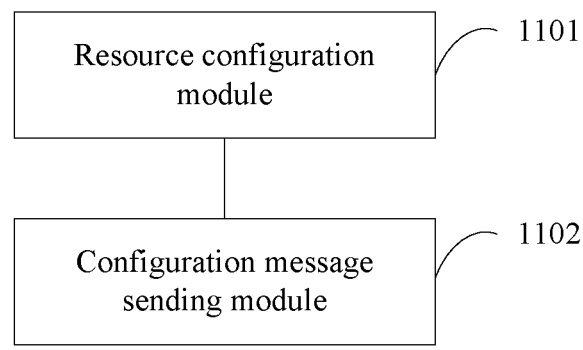
FIG. 11 is a schematic structural diagram of a data sending apparatus according to an embodiment of the present invention.

FIG. 11 is a schematic structural diagram of a data sending apparatus according to an embodiment of the present invention. Referring to FIG. 11, the apparatus includes: a resource configuration module 1101, configured to configure a competitive resource for user equipment according to load amounts of multiple resources when the network device receives a resource request of the user equipment; and a configuration message sending module 1102, configured to send a configuration response message to the user equipment according to the competitive resource configured by the resource configuration module 1101, so that the user equipment obtains competitive resource configuration information according to the configuration response message, determines, according to the competitive resource configuration information, the competitive resource configured for the user equipment, and sends generated communication service data on the competitive resource.

The apparatus provided in this embodiment of the present invention configures a competitive resource for user equipment according to load amounts of multiple resources when receiving a resource request of the user equipment, so that the apparatus can flexibly configure competitive resources for multiple user equipments that perform communication services. Compared with a scenario in which all user equipments simultaneously use a same resource, in this embodiment of the present invention, competitive resources are respectively and flexibly configured for multiple user equipments that perform communication services. Therefore, a quantity of user equipments that simultaneously use a same competitive resource is reduced, and a problem of network congestion caused by a conflict occurring when multiple user equipments perform communication services is resolved. When the user equipment sends data on the configured competitive resource, a probability of a conflict is reduced, and network congestion is relieved.

Optionally, the configuration message sending module 1102 is configured to: broadcast the configuration response message, so that the user equipment receives the configuration response message; or send the configuration response message to the user equipment in a unicast manner.

Figure 12:
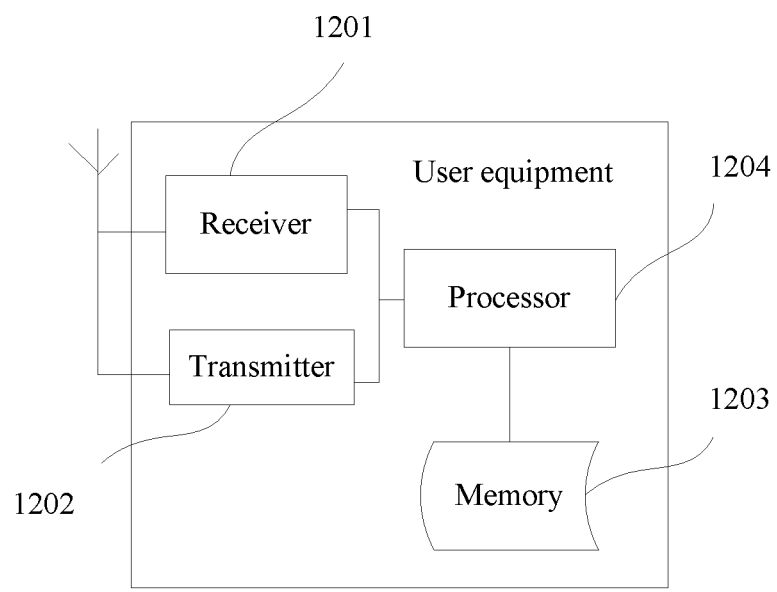
FIG. 12 is a schematic structural diagram of user equipment according to an embodiment of the present invention.

FIG. 12 is a schematic structural diagram of user equipment according to an embodiment of the present invention. Referring to FIG. 12, the user equipment includes a receiver 1201, a transmitter 1202, a memory 1203, and a processor 1204. The receiver 1201 and the transmitter 1202 are separately connected to the processor 1204, the memory 1203 stores program code, and the processor 1204 is configured to invoke the program code to perform the following operations: generating communication service data; obtaining competitive resource configuration information used for sending the communication service data; determining, according to the competitive resource configuration information, a competitive resource configured for the user equipment; and sending the communication service data on the competitive resource.

Optionally, the processor 1204 is further configured to invoke the program code to perform the following operations: determining whether to initiate a resource request used for obtaining the competitive resource configuration information; if it is determined to initiate the resource request, sending the resource request to a network device; receiving a configuration response message sent by the network device; and obtaining the competitive resource configuration information according to the configuration response message.

Optionally, the processor 1204 is further configured to invoke the program code to perform the following operations: determining, according to a resource request indication, to initiate the resource request, where the resource request indication is preconfigured on the user equipment or pre-sent by the network device to the user equipment; determining, according to a type of a communication service, whether to initiate the resource request; or when it is detected that the user equipment is currently in coverage of a wireless signal of the network device, determining to initiate the resource request; or measuring a load amount of a current competitive resource, and when the load amount is greater than a first preset load threshold, determining to initiate the resource request.

Optionally, the processor 1204 is further configured to invoke the program code to perform the following operations: obtaining the competitive resource configuration information from preconfigured resource configuration information; or obtaining the competitive resource configuration information according to an activation time of a communication service; or receiving a broadcast message of a network device, and obtaining the competitive resource configuration information from the broadcast message; or measuring load amounts of multiple candidate resources, and obtaining the competitive resource configuration information according to a measurement result.

Optionally, the processor 1204 is further configured to invoke the program code to perform the following operations: if it is determined that a load amount of a first candidate resource in the multiple candidate resources is less than a second preset load threshold, determining resource information of the first candidate resource as the competitive resource configuration information; or determining resource information of a candidate resource with a minimum load amount in the multiple candidate resources as the competitive resource configuration information.

Optionally, the processor 1204 is further configured to invoke the program code to perform the following operations: measuring an amount of data received on the competitive resource; or measuring strength of a signal received on the competitive resource; or measuring duration of specified strength of a signal received on the competitive resource, where the specified signal strength refers to signal strength higher than a preset strength threshold; or measuring a transmission rate of data received on the competitive resource; or measuring duration of a specified transmission rate of data received on the competitive resource, where the specified data transmission rate refers to a data transmission rate higher than a preset transmission rate threshold.

Optionally, the processor 1204 is further configured to invoke the program code to perform the following operations: sending the communication service data on the competitive resource when determining the competitive resource; or randomly generating backoff duration after determining the competitive resource, and sending the communication service data after the backoff duration expires; or determining, after determining the competitive resource, whether the competitive resource is idle; and sending the communication service data if the competitive resource is idle; or randomly generating backoff duration after determining the competitive resource, determining, after the backoff duration expires, whether the competitive resource is idle, and sending the communication service data if the competitive resource is idle.

Optionally, the processor 1204 is further configured to invoke the program code to perform the following operations: determining a configured competitive resource style according to the competitive resource configuration information, where the competitive resource style includes a distribution rule of multiple competitive resources; and determining the multiple competitive resources according to the distribution rule.

Optionally, the competitive resource style includes at least one of the following: a resource start location and a resource end location of the multiple competitive resources; or an allocation cycle of the multiple competitive resources, and at least one resource start location and at least one resource end location of each competitive resource in a corresponding allocation cycle; or an allocation cycle of the multiple competitive resources, and a resource start location and a resource length of each competitive resource in a corresponding allocation cycle.

Optionally, the processor 1204 is further configured to invoke the program code to perform the following operations: sending the communication service data on the competitive resource to another user equipment by using a wireless interface between the user equipment and the another user equipment; or sending the communication service data on the competitive resource to a network device by using a wireless interface between the user equipment and the network device.

All the foregoing optional technical solutions may be randomly combined to form an optional embodiment of the present invention. Details are not repeatedly described herein.

Figure 13:
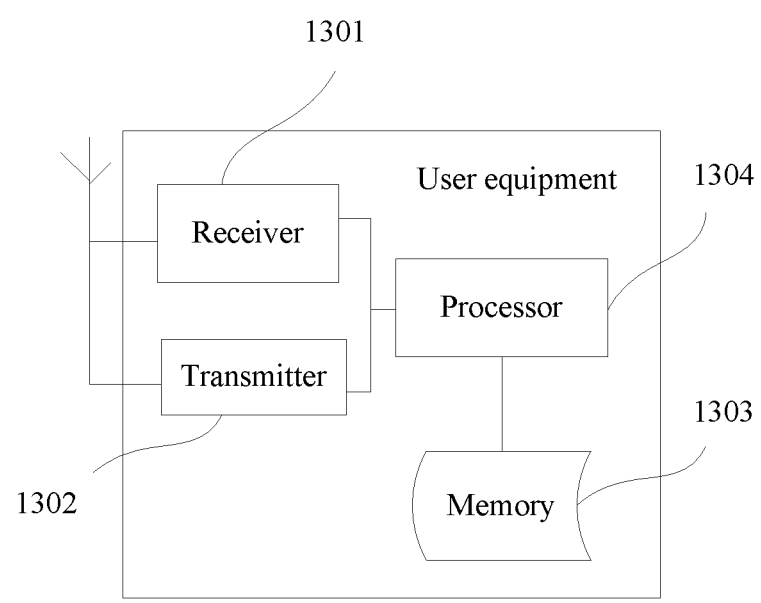
FIG. 13 is a schematic structural diagram of another user equipment according to an embodiment of the present invention.

FIG. 13 is a schematic structural diagram of user equipment according to an embodiment of the present invention. Referring to FIG. 13, the user equipment includes a receiver 1301, a transmitter 1302, a memory 1303, and a processor 1304. The receiver 1301 and the transmitter 1302 are separately connected to the processor 1304, the memory 1303 stores program code, and the processor 1304 is configured to invoke the program code to perform the following operations: generating communication service data; obtaining competitive resource configuration information used for sending the communication service data; determining, according to the competitive resource configuration information, a competitive resource style configured for the user equipment, where the competitive resource style includes a distribution rule of multiple competitive resources; measuring the multiple competitive resources according to the distribution rule, to obtain a measurement result; determining whether to send a measurement result report to a network device; and if it is determined to send the measurement result report to the network device, sending a measurement result report that includes the measurement result to the network device.

Optionally, the processor 1304 is further configured to invoke the program code to perform the following operations: when the competitive resource style includes a resource start location and a resource end location of the multiple competitive resources, the user equipment measures competitive resources between the resource start location and the resource end location, to obtain a measurement result; or when the competitive resource style includes an allocation cycle of the multiple competitive resources, and at least one resource start location and at least one resource end location of each competitive resource in a corresponding allocation cycle, for each allocation cycle, the user equipment determines multiple competitive resources in the allocation cycle according to the at least one resource start location and the at least one resource end location in the allocation cycle, and measures the multiple competitive resources, to obtain a measurement result; or when the competitive resource style includes an allocation cycle of the multiple competitive resources, and a resource start location and a resource length of each competitive resource in a corresponding allocation cycle, for each allocation cycle, the user equipment determines competitive resources in the allocation cycle according to the resource start location and the resource length in the allocation cycle, and measures the competitive resources, to obtain a measurement result.

Figure 14:
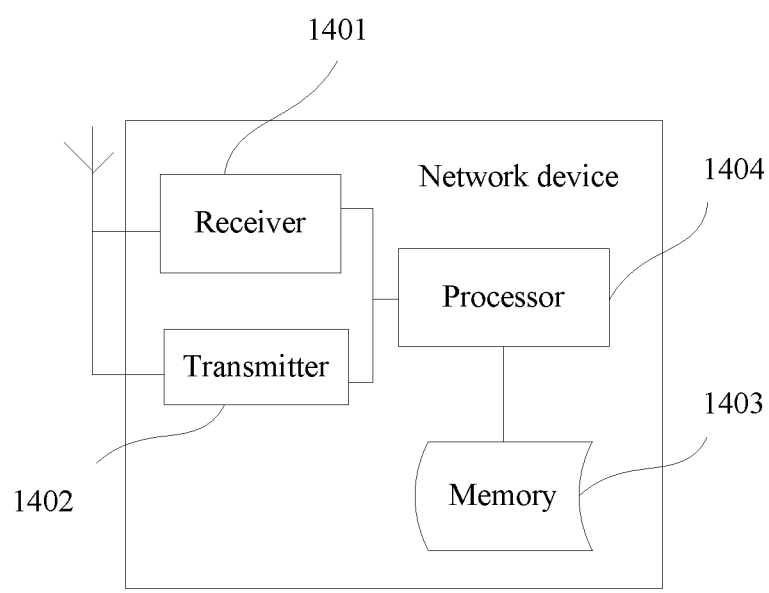
FIG. 14 is a schematic structural diagram of a network device according to an embodiment of the present invention.

FIG. 14 is a schematic structural diagram of a network device according to an embodiment of the present invention. Referring to FIG. 14, the user equipment includes a receiver 1401, a transmitter 1402, a memory 1403, and a processor 1404, and the receiver 1401 and the transmitter 1402 are separately connected to the processor 1404. Certainly, the network device may further include general components, such as an antenna, a baseband processing component, an intermediate radio frequency processing component, and an input and output apparatus. This is not limited in this embodiment of the present invention.

The memory 1403 stores program code, and the processor 1404 is configured to invoke the program code to perform the following operations: configuring a competitive resource for user equipment according to load amounts of multiple resources when receiving a resource request of the user equipment; and sending a configuration response message to the user equipment according to the competitive resource, so that the user equipment obtains competitive resource configuration information according to the configuration response message, determines, according to the competitive resource configuration information, the competitive resource configured for the user equipment, and sends generated communication service data on the competitive resource.

Optionally, the processor 1404 is further configured to invoke the program code to perform the following operations: broadcasting the configuration response message, so that the user equipment receives the configuration response message; or sending the configuration response message to the user equipment in a unicast manner.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc. The foregoing descriptions are merely examples of embodiments of the present invention, but are not intended to limit the present invention. Any modification, equivalent replacement, and improvement made without departing from the spirit and principle of the present invention shall fall within the protection scope of the present invention.

What is claimed is:

1. A method, comprising:
   obtaining, by user equipment, competitive resource configuration information comprising a distribution rule of one or more competitive resources and a strength threshold;
   determining, by the user equipment, the one or more competitive resources according to the distribution rule;
   measuring, by the user equipment, a strength of a wireless signal received on each of the one or more competitive resources;
   determining, by the user equipment from the one or more competitive resources, one or more available resources according to the strength threshold and the strength of the wireless signal received on each of the one or more competitive resources; and
   sending, by the user equipment, communication service data on one or more of the determined available resources.

2. The method according to claim 1, wherein the distribution rule of the one or more competitive resources comprises:
   an allocation cycle of the one or more competitive resources, and a resource start location and a resource length of the allocation cycle.

3. The method according to claim 1, wherein the determining one or more available resources comprises:
   determining, by the user equipment, one of the competitive resources is available when the measured strength of the wireless signal received on the one competitive resource is less than the strength threshold.

4. The method according to claim 1, further comprising:
   obtaining, by the user equipment, measurement configuration information from a first network device, the measurement configuration information comprising a reporting threshold.

5. The method according to claim 4, further comprising:
   measuring, by the user equipment, a load amount of the one or more competitive resources to obtain a measurement result; and
   determining, by the user equipment according to the obtained measurement result and the reporting threshold, whether the obtained measurement result is to be sent to the first network device.

6. The method according to claim 5, wherein the determining whether the obtained measurement result is to be sent to the first network device comprises:
   determining whether the obtained measurement result meets or exceeds the reporting threshold.

7. The method according to claim 1, wherein the obtaining competitive resource configuration information comprises:
   receiving, by the user equipment, the competitive resource configuration information from a second network device.

8. An apparatus, comprising:
   memory, configured to store computer executable program code; and
   a processor coupled to the memory, wherein
   the program code comprises instructions that, when executed by the processor, cause the apparatus to perform the following operations:
      obtaining competitive resource configuration information comprising a distribution rule of one or more competitive resources and a strength threshold;
      determining the one or more competitive resources according to the distribution rule;
      measuring a strength of a wireless signal received on each of the one or more competitive resources;
      determining, from the one or more competitive resources, one or more available resources according to the strength threshold and the strength of the wireless signal received on each of the one or more competitive resources; and
      sending communication service data on one or more of the determined available resources.

9. The apparatus according to claim 8, wherein the distribution rule comprises:
   an allocation cycle of the one or more competitive resources, and a resource start location and a resource length of the allocation cycle.

10. The apparatus according to claim 8, wherein the operation of determining one or more available resources comprises:
    determining one of the competitive resources is available when the measured strength of the wireless signal received on the one competitive resource is less than the strength threshold.

11. The apparatus according to claim 8, wherein the operations further comprise:
    obtaining measurement configuration information from a first network device, the measurement configuration information comprising a reporting threshold.

12. The apparatus according to claim 11, wherein the operations further comprise:
    measuring a load amount of the one or more competitive resources to obtain a measurement result; and
    determining, according to the obtained measurement result and the reporting threshold, whether the obtained measurement result is to be sent to the first network device.

13. The apparatus according to claim 12, wherein the operation of determining whether the obtained measurement result is to be sent to the first network device comprises:
    determining whether the obtained measurement result meets or exceeds the reporting threshold.

14. The apparatus according to claim 8, wherein the operation of obtaining competitive resource configuration information comprises:
    receiving the competitive resource configuration information from a second network device.

15. A non-transitory computer-readable storage medium storing computer instructions that are configured, when executed by one or more processors, cause the one or more processors to perform the operations comprising:
    obtaining competitive resource configuration information comprising a distribution rule of one or more competitive resources and a strength threshold;
    determining the one or more competitive resources according to the distribution rule;
    measuring a strength of a wireless signal received on each of the one or more competitive resources;

determining, from the one or more competitive resources, one or more available resources according to the strength threshold and the strength of the wireless signal received on each of the one or more competitive resources; and sending communication service data on one or more of the determined available resources.

16. The computer-readable storage medium according to claim 15, wherein the operation of determining one or more available resources comprises:

determining one of the competitive resources is available when the measured strength of the wireless signal received on the one competitive resource is less than the strength threshold.

17. The computer-readable storage medium according to claim 15, wherein the operations further comprise:

obtaining measurement configuration information from a first network device, the measurement configuration information comprises a reporting threshold.

18. The computer-readable storage medium according to claim 17, wherein the operations further comprise:

measuring a load amount of the one or more competitive resources to obtain a measurement result; and determining, according to the obtained measurement result and the reporting threshold, whether the obtained measurement result is to be sent to the first network device.

19. The computer-readable storage medium according to claim 18, wherein the operation of determining whether the obtained measurement result is to be sent to the first network device comprises:

determining whether the obtained measurement result meets or exceeds the reporting threshold.

20. The computer-readable storage medium according to claim 15, wherein the operation of obtaining competitive resource configuration information comprises:

receiving the competitive resource configuration information from a second network device.

* * * * *